United States Patent
Mathis et al.

(10) Patent No.: US 11,938,616 B2
(45) Date of Patent: Mar. 26, 2024

(54) SWAGE END EFFECTOR WITH AUTOMATED FASTENER SIZE CHANGE CAPABILITY

(71) Applicant: The Boeing Company, Chicago, IL (US)

(72) Inventors: Dennis R. Mathis, St. Peterburg, FL (US); Andrew J. Maass, Mt. Pleasant, SC (US); Daniel B. Freeman, Goose Creek, SC (US); Rachel M. Chow, Highlands Ranch, CO (US); Tyler E. Berkey, Charleston, SC (US)

(73) Assignee: The Boeing Company, Chicago, IL (US)

( * ) Notice: Subject to any disclaimer, the term of this patent is extended or adjusted under 35 U.S.C. 154(b) by 119 days.

(21) Appl. No.: 17/366,624

(22) Filed: Jul. 2, 2021

(65) Prior Publication Data
US 2022/0193926 A1 Jun. 23, 2022

Related U.S. Application Data

(60) Provisional application No. 63/127,742, filed on Dec. 18, 2020.

(51) Int. Cl.
*B25J 15/00* (2006.01)
*B21J 15/02* (2006.01)
*B25J 15/04* (2006.01)

(52) U.S. Cl.
CPC ......... *B25J 15/0408* (2013.01); *B21J 15/022* (2013.01); *B25J 15/0019* (2013.01); *B25J 15/0416* (2013.01); *B25J 15/0491* (2013.01)

(58) Field of Classification Search
CPC ........ B21J 15/022; B21J 15/12; B21J 15/142; B21J 15/20; B21J 15/32; B21J 15/043; B21J 15/045; B25J 15/0408; B25J 15/0416; B25J 15/0019
USPC ......................................... 72/391.2
See application file for complete search history.

(56) References Cited

U.S. PATENT DOCUMENTS

| | | | | |
|---|---|---|---|---|
| 4,885,836 A * | 12/1989 | Bonomi | ................. | B25J 9/0084 29/818 |
| 6,253,448 B1 * | 7/2001 | Zieve | ....................... | B21J 15/32 29/709 |
| 6,662,420 B1 * | 12/2003 | Rosier | ..................... | B21J 15/22 29/243.529 |
| 8,286,323 B2 * | 10/2012 | Toh | ........................ | B21J 15/142 29/709 |
| 8,302,272 B2 * | 11/2012 | Dear | ..................... | B21J 15/022 29/243.517 |
| 9,032,602 B2 * | 5/2015 | Woods | ..................... | G01B 5/24 29/407.03 |
| 9,296,076 B2 * | 3/2016 | Soto Martinez | .......... | B64F 5/10 |

(Continued)

OTHER PUBLICATIONS

KR 102164448 B1, Lee et al. Oct. 2020.*
EP 3037190 A1, Riotte Jun. 2016.*
CN 110142372, Zhao et al. Aug. 2019.*

*Primary Examiner* — Edward T Tolan
(74) *Attorney, Agent, or Firm* — Felix L. Fischer

(57) ABSTRACT

A lockbolt swage end effector incorporates a swage tool releasably engaged by a connector assembly to hydraulic operator carried in a frame. A two piece core-bolt operably connects the swage tool and the hydraulic operator through the connector assembly. A connection flange attaches the frame to a mating flange on a robotic manipulator.

18 Claims, 21 Drawing Sheets

(56) References Cited

U.S. PATENT DOCUMENTS 10,967,419 B2 * 4/2021 Buttrick .................. B21J 15/32
11,027,326 B2 * 6/2021 Eusterwiemann .... B23P 19/002

* cited by examiner

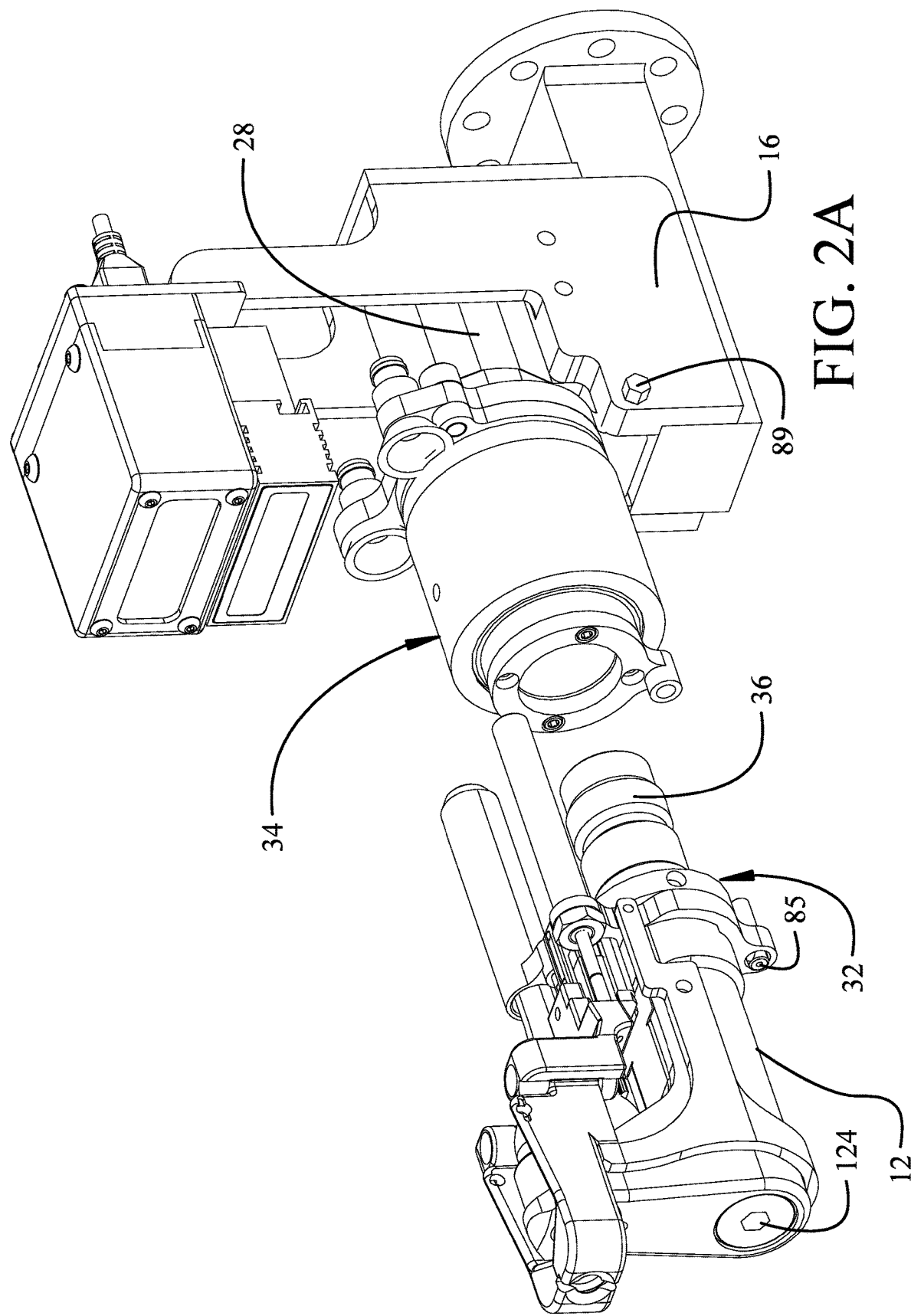

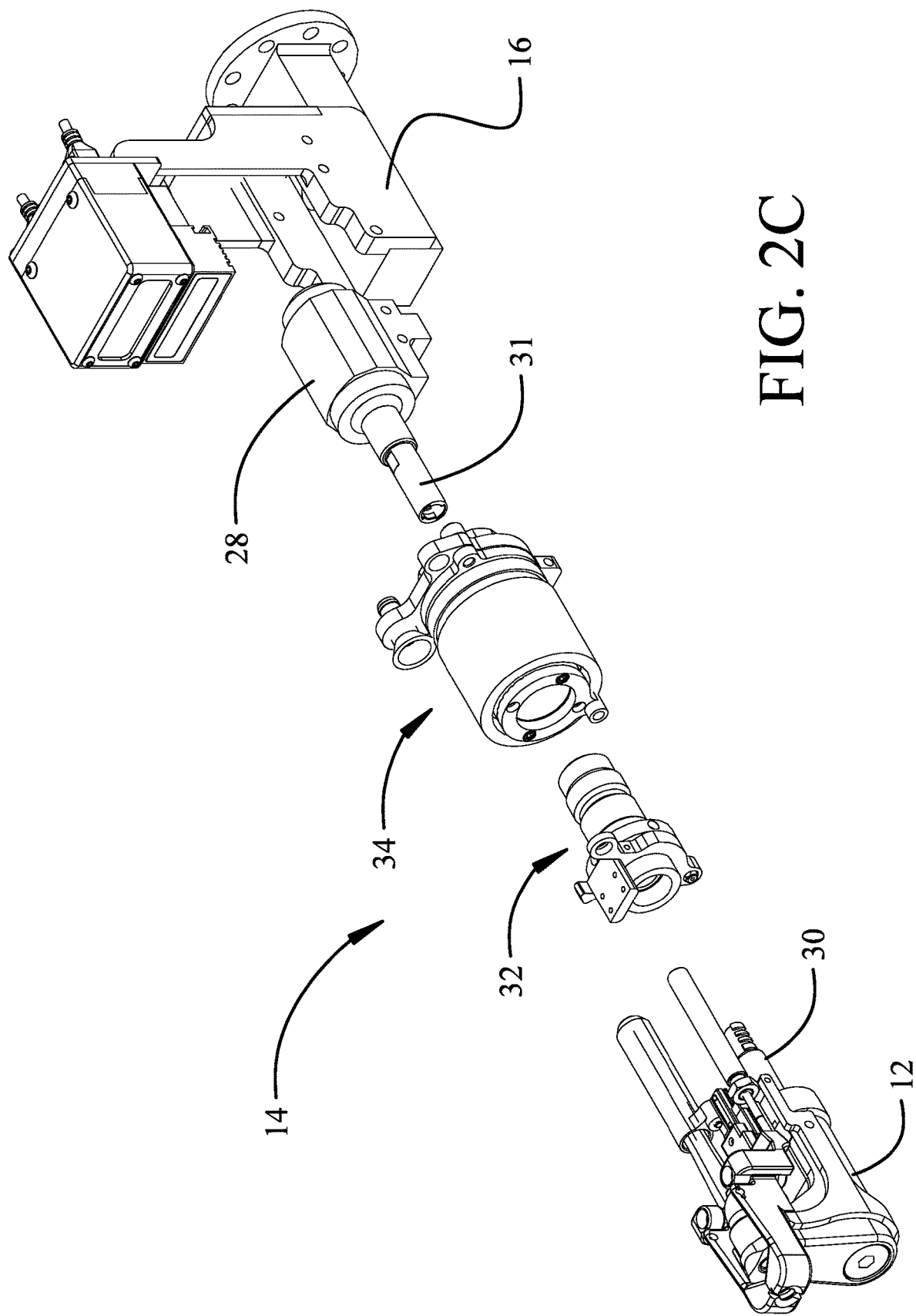

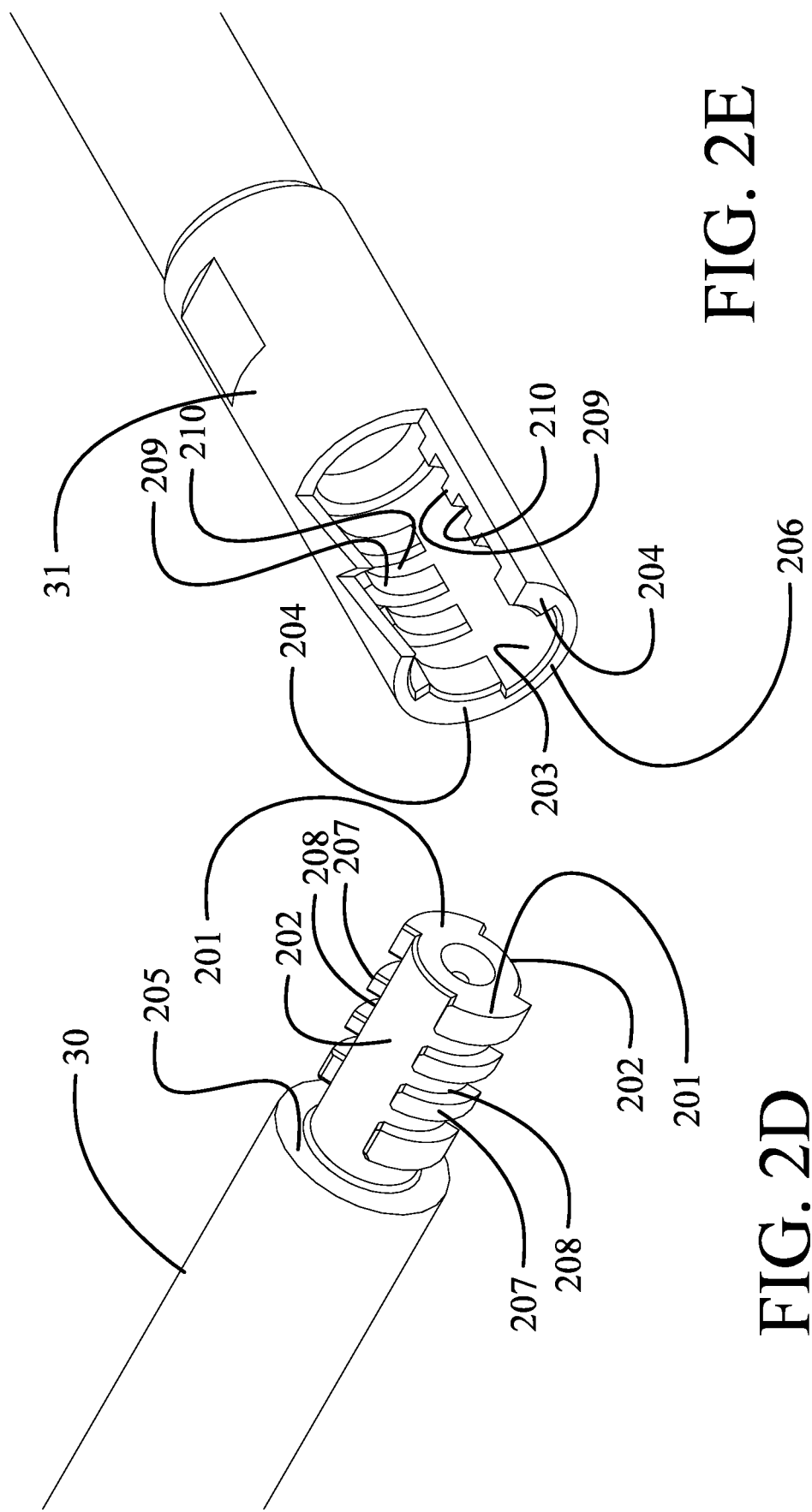

SWAGE END EFFECTOR WITH AUTOMATED FASTENER SIZE CHANGE CAPABILITY

REFERENCE TO RELATED APPLICATIONS

This application claims priority of U.S. provisional application Ser. No. 63/127,742 filed on Dec. 18, 2020 entitled SWAGE END EFFECTOR WITH AUTOMATED FASTENER SIZE CHANGE CAPABILITY having a common assignee with the present application, the disclosure of which is incorporated herein by reference. This application is copending with application Ser. No. 17/366,589 entitled COMPACT LOCKBOLT SWAGE END EFFECTOR WITH COLLAR PICKUP AND RETENTION JAWS having a common assignee with the present application and filed on Jul. 2, 2021, the disclosure of which is incorporated herein by reference.

BACKGROUND INFORMATION

Field

This disclosure relates generally to the field of structure fabrication systems and, more particularly to a robotic assembler end effector having a quick change connector assembly for a swage tool and collar pickup and retention system for lockbolt engagement and swaging.

BACKGROUND

Manufacturing of commercial aircraft and other large scale structures employs robotic systems for many operations. Lockbolt fasteners are extensively used in fabrication of aircraft and other large structures, particularly where large numbers of fasteners are employed in linear arrays to join plate and structural elements. Lockbolt stems protruding from installed locations require mating with a locking collar, swaging of the collar and fracturing of the lockbolt frangible stem. Assembly and swaging of such lockbolt fasteners is a highly repetitive and time-consuming operation. Additionally, the lockbolt fasteners have multiple sizes requiring different size collars and swage tools. Current automated systems are large and require manual exchange of installation dies. Automated systems for collar selection, positioning and swaging for a number of fastener sizes are not currently available, particularly for applications requiring access to restricted-access areas where current large systems will not fit.

SUMMARY

Exemplary implementations provide a lockbolt swage end effector having a swage tool releasably engaged by a connector assembly to hydraulic operator carried in a frame. A two-piece core-bolt operably connects the swage tool and the hydraulic operator. A connection flange attaches the frame to a mating flange on a robotic manipulator.

The exemplary implementations provide a method for automated exchange of a swage tool. A position signal is received in a controller for a designated size swage tool to be engaged from a tool stand and a pneumatic/vacuum valve is activated with a control signal to translate a locking sleeve to a released position. A frame carrying a hydraulic operator is positioned adjacent the designated size swage tool by controlling a robotic manipulator connected to the frame. The robotic manipulator is extended to receive a probe extending from the swage tool in a retainer barrel connected to the hydraulic operator. The pneumatic/vacuum valve is actuated translating the locking sleeve over the retainer barrel to a locked position constraining locking balls in a locking groove in the probe. A core-bolt receiver extending from the hydraulic operator or a core-bolt shaft extending from the swage tool is rotated to engage teeth between the core-bolt receiver and shaft. The attached swage tool is removed from the tool stand and the robotic manipulator is positioned for engagement of a fastener collar, positioning the collar on a fastener stem and swaging the collar.

BRIEF DESCRIPTION OF THE DRAWINGS

The features, functions, and advantages that have been discussed can be achieved independently in various implementations or may be combined in yet other implementations further details of which can be seen with reference to the following description and drawings.

FIGS. 2A and 2B are forward and aft pictorial representations of the swage end effector with the swage tool disengaged from the hydraulic operator and frame;

FIG. 2C is an exploded pictorial representation of the swage end effector, elements of the connector assembly, the hydraulic operator and frame;

FIG. 2D is a detailed pictorial representation of the core-bolt shaft;

FIG. 2E is a detailed partially sectioned pictorial representation of the core-bolt receiver;

DETAILED DESCRIPTION

The implementations described herein provide a swage end effector with automated size change capability to enable automated installation of collars on lockbolts for varying size fasteners. The end effector includes a jaw assembly and swage tool with a pair of articulating jaws configured to pick-up, retain, and install the collars. A connector assembly has a probe assembly extending from the swage tool configured to removably engage a receiver assembly attached to a frame housing a hydraulic operator. The connector assembly allows interchanging of the jaw assembly and swage tool on the frame to accommodate various fastener sizes.

Figure 1:
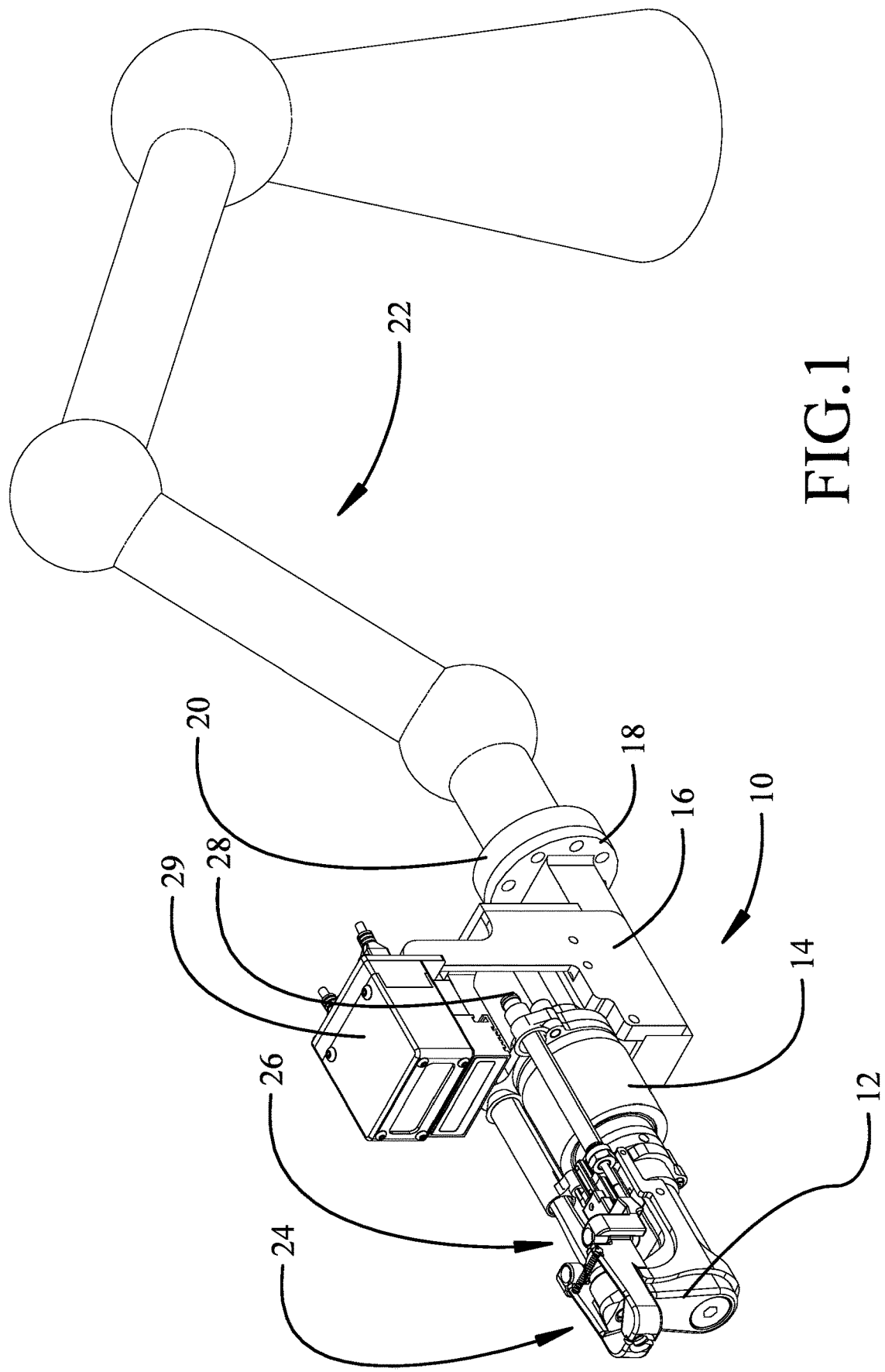
FIG. 1 is a pictorial representation of an example implementation of a swage end effector with automated fastener size change capability.

Referring to the drawings, FIG. 1 shows an example implementation of the lockbolt swage end effector 10. The end effector 10 incorporates a swage tool 12 releasably engaged to a frame 16 that terminates in a connection flange 18. A connector assembly 14 engages the swage tool 12 to the frame 16. A jaw assembly 24 is supported on a mounting assembly 26 attached to the swage tool 12. A two-piece core-bolt (subsequently shown and described) operably connects the swage tool 12 and a hydraulic operator 28 carried in the frame 16. A vision system 29 is mounted to the frame 16 for use in guidance of the robotic manipulator 22. The connection flange 18 on the frame 16 provides for attachment of the end effector 10 to a robotic manipulator 22 having a mating flange 20.

Figure 2B:
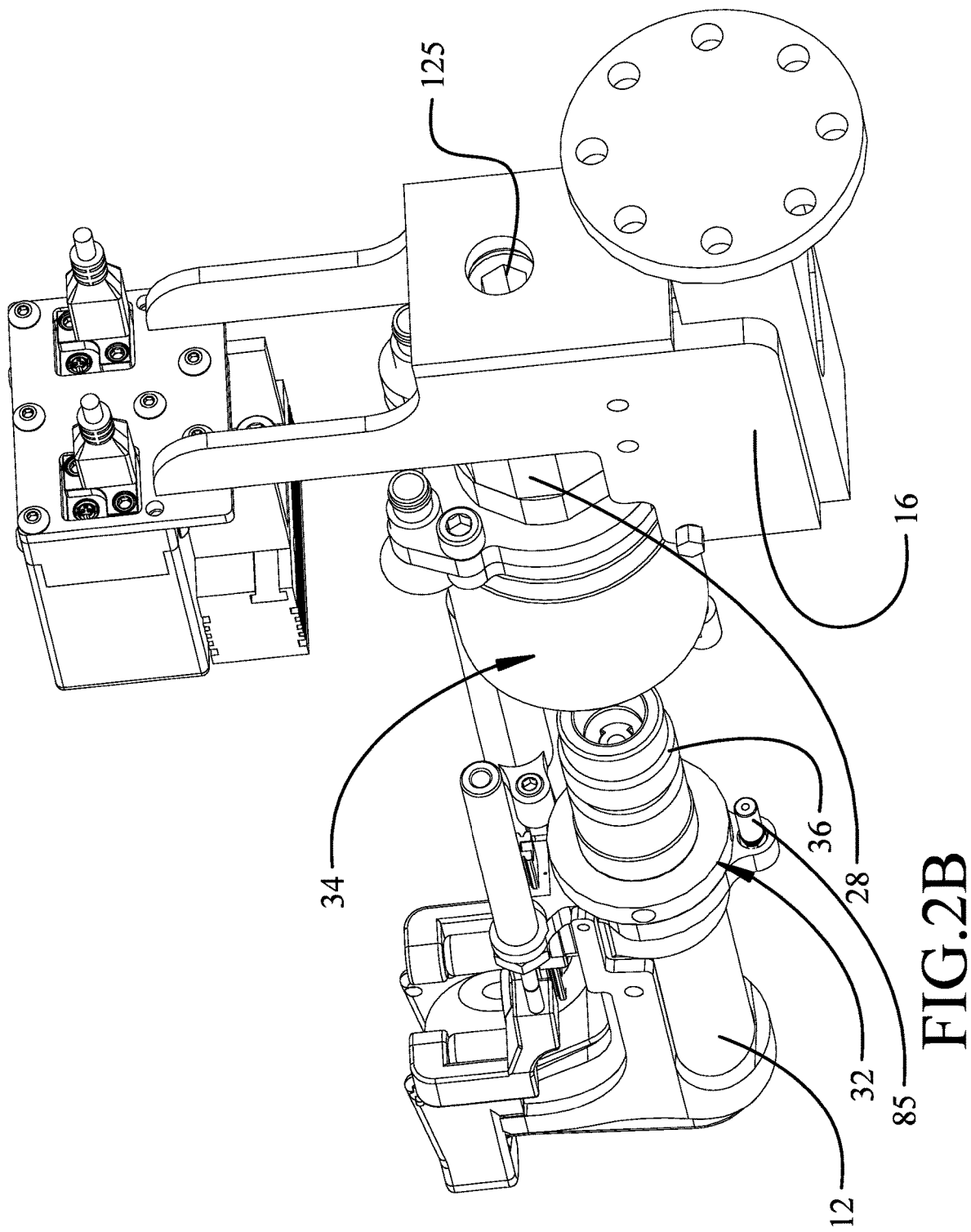

As seen in FIGS. 2A and 2B and the exploded view of FIG. 2C, the swage tool 12 is removably connected to the hydraulic operator 28 supported by the frame 16. Connection is accomplished in the connector assembly 14 with a probe assembly 32, extending from the swage tool 12, that is removably engageable in a receiver assembly 34 attached to the hydraulic operator 28 and frame 16. The two-piece core-bolt has a core-bolt shaft 30 extending from the swage tool 12 and a core-bolt receiver 31 extending from the hydraulic operator 28.

As seen in detail in FIGS. 2D and 2E, the core-bolt shaft 30 and core-bolt receiver 31 are configured to engage in a two-step process; a longitudinal linear coupling and a rotational locking, described in greater detail subsequently. In the example implementation to accomplish this functional configuration, the core-bolt shaft 30 employs a plurality of first linear bosses 201, two in the example, and a plurality of first linear pockets 202 and the core-bolt receiver employs a matching plurality of second linear pockets 203 and a matching plurality of second linear bosses 204. During connection of the swage tool 12 and hydraulic operator 28, as will be described in greater detail subsequently, the core-bolt shaft 30 and core-bolt receiver 31 are placed in an aligned orientation whereby the plurality of first linear bosses 201 are received in the plurality of second linear pockets 203 and the plurality of second linear bosses 204 are received in the plurality of second linear pockets 203 during longitudinal translation of the core-bolt shaft 30 and core-bolt receiver 31. A shaft contact face 205 engages a receiver contact face 206 upon completion of the translation.

For rotational locking, each of the plurality of first linear bosses 201 incorporates a plurality of longitudinally spaced first rotational bosses 207 and a plurality of rotational pockets 208 intermediate the first rotational bosses 207. Similarly, each of the plurality of second linear bosses 204 incorporates a plurality of longitudinally spaced second rotational bosses 209 and a plurality of second rotational pockets 210 intermediate the second rotational bosses 209. The core-bolt shaft 30 and core-bolt receiver 31 are rotatable to a rotated position with the first rotational bosses 207 into the second rotational pockets 210 and second rotational bosses 209 into the first rotational pockets 208.

Figure 3A:
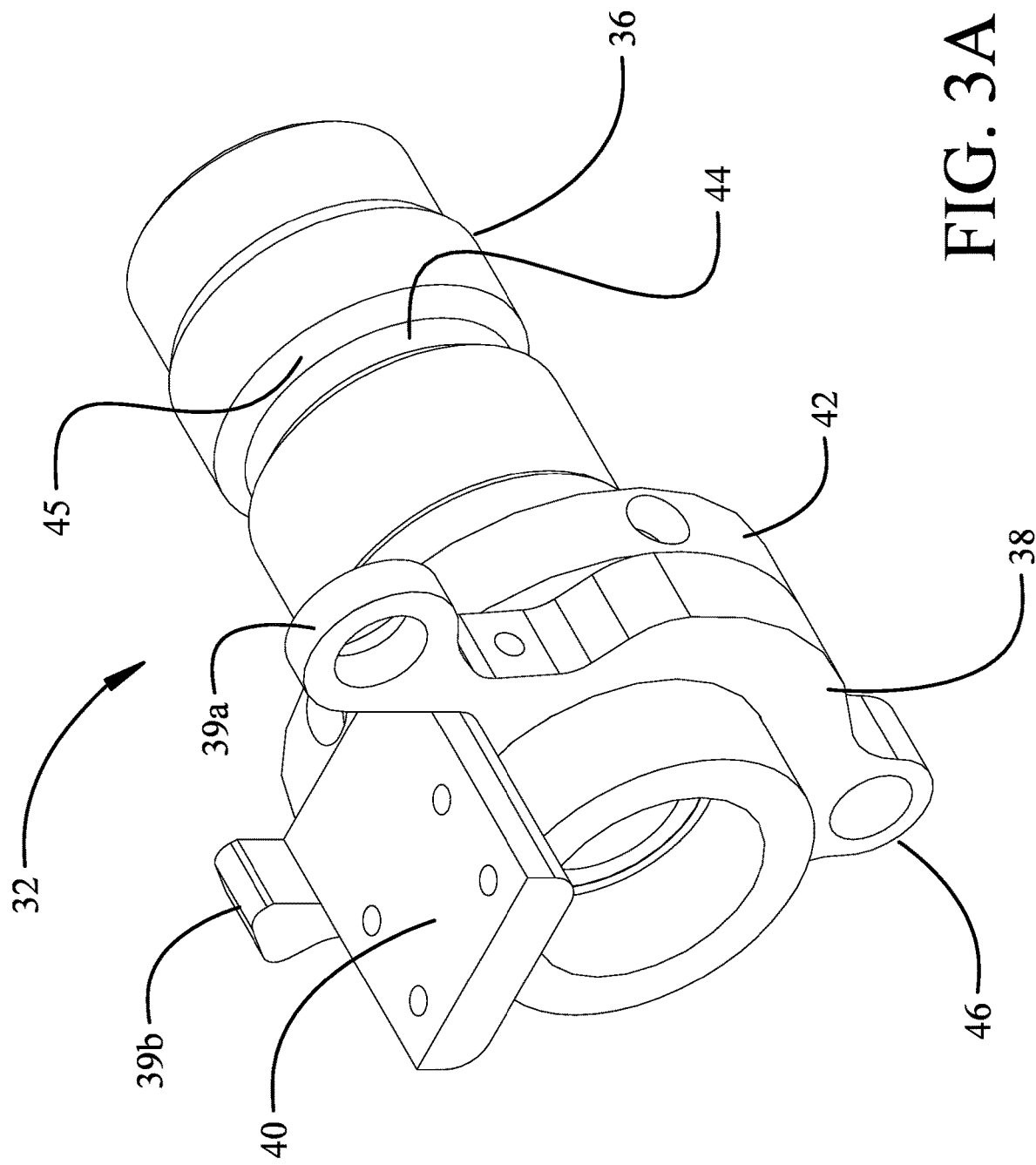
FIGS. 3A and 3B are a detailed pictorial representation of the end effector plug assembly and an exploded view of the internal elements of the assembly.
Figure 3B:
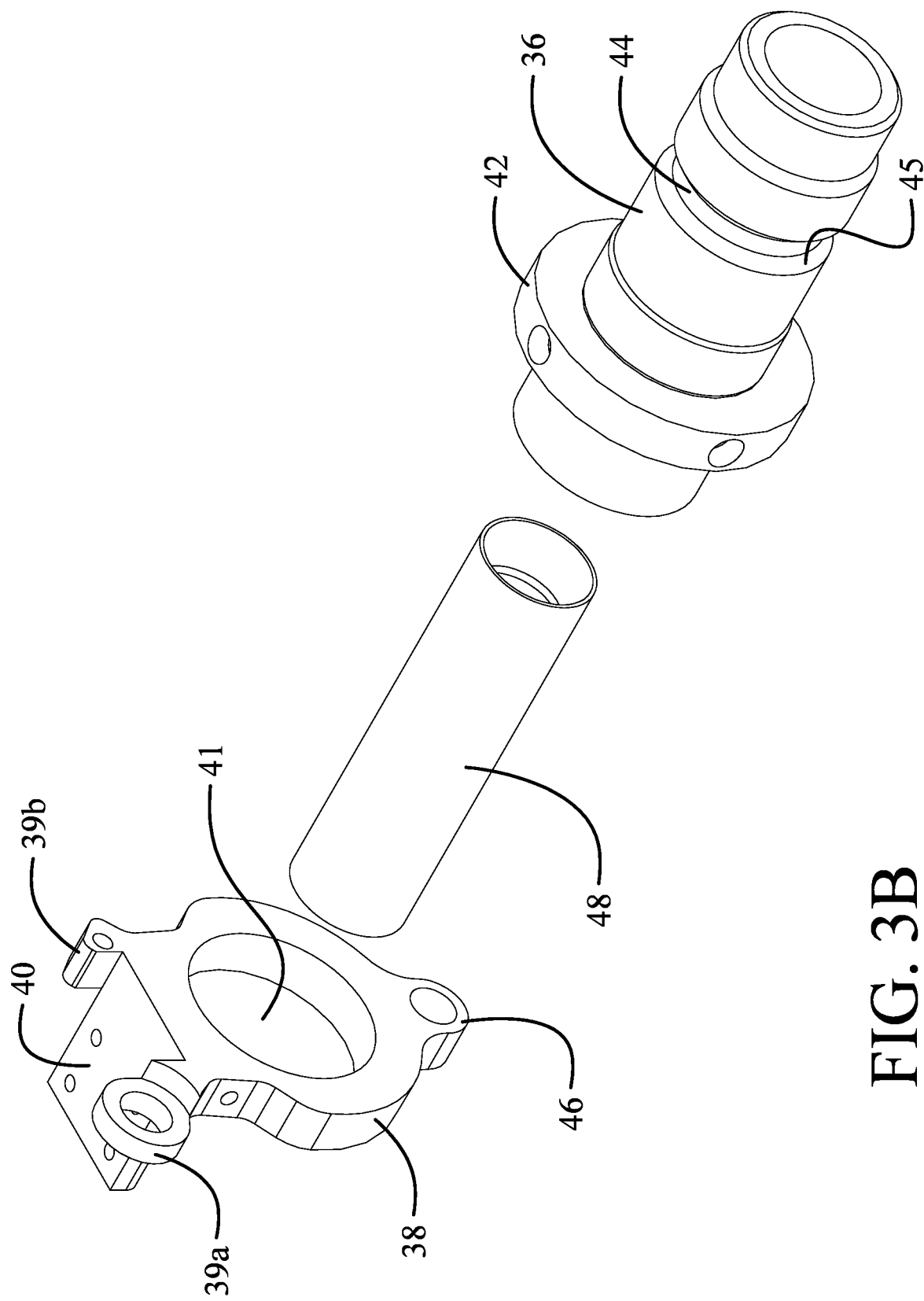

As seen in detail in FIGS. 3A and 3B, the probe assembly 32 includes a probe 36 which is concentrically insertable into the receiver assembly 34. For the exemplary implementation, the elements of the probe assembly 32 and the receiver assembly 34, subsequently described, are cylindrical. In alternative implementations the various elements may have alternative geometric cross sections adapted for concentric alignment. The probe assembly 32 is secured to the swage tool 12. In the exemplary implementation, the probe 36 threads into the swage tool 12. A probe flange 38 having a top plate 40 receives the probe 36 through an aperture 41 and a cylindrical land 42 on the probe 36 abuts the probe flange 38. The probe flange 38 is coupled between the cylindrical land 42 and the swage tool 12. The top plate 40 may additionally be fastened to the mounting assembly 26 on the swage tool 12. Mounting bosses 39a and 39b are provided on the probe flange 38 adapted to attach a pneumatic operator and debris extractor to be described subsequently. The probe 36 includes a circumferential locking groove 44, explained in greater detail subsequently. A forward alignment boss 46 extends from the probe flange 38. A core-bolt bushing 48 is concentrically housed within the probe 36.

Figure 4A:
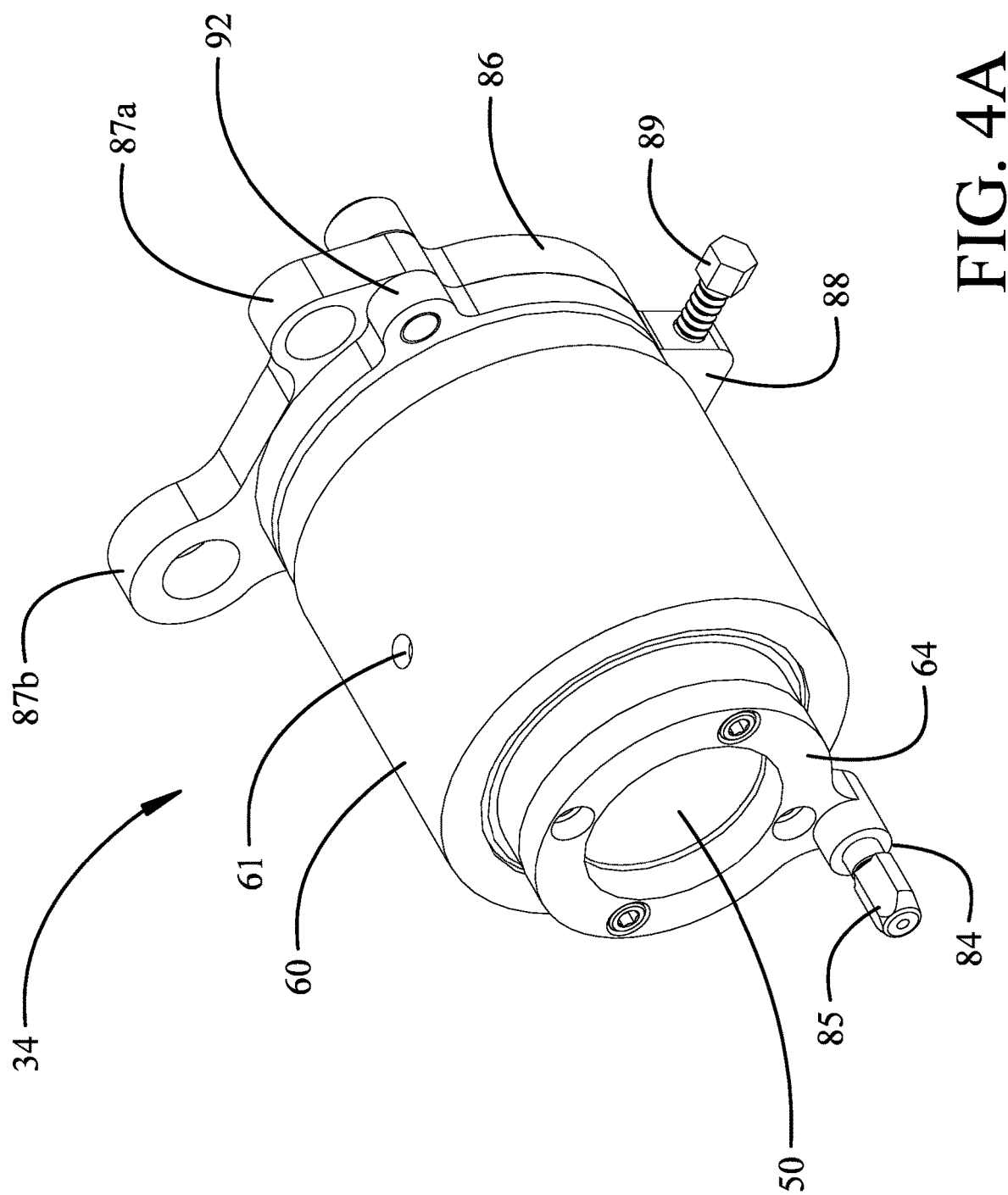
FIG. 4A is a detailed pictorial representation of the receiver assembly.
Figure 4B:
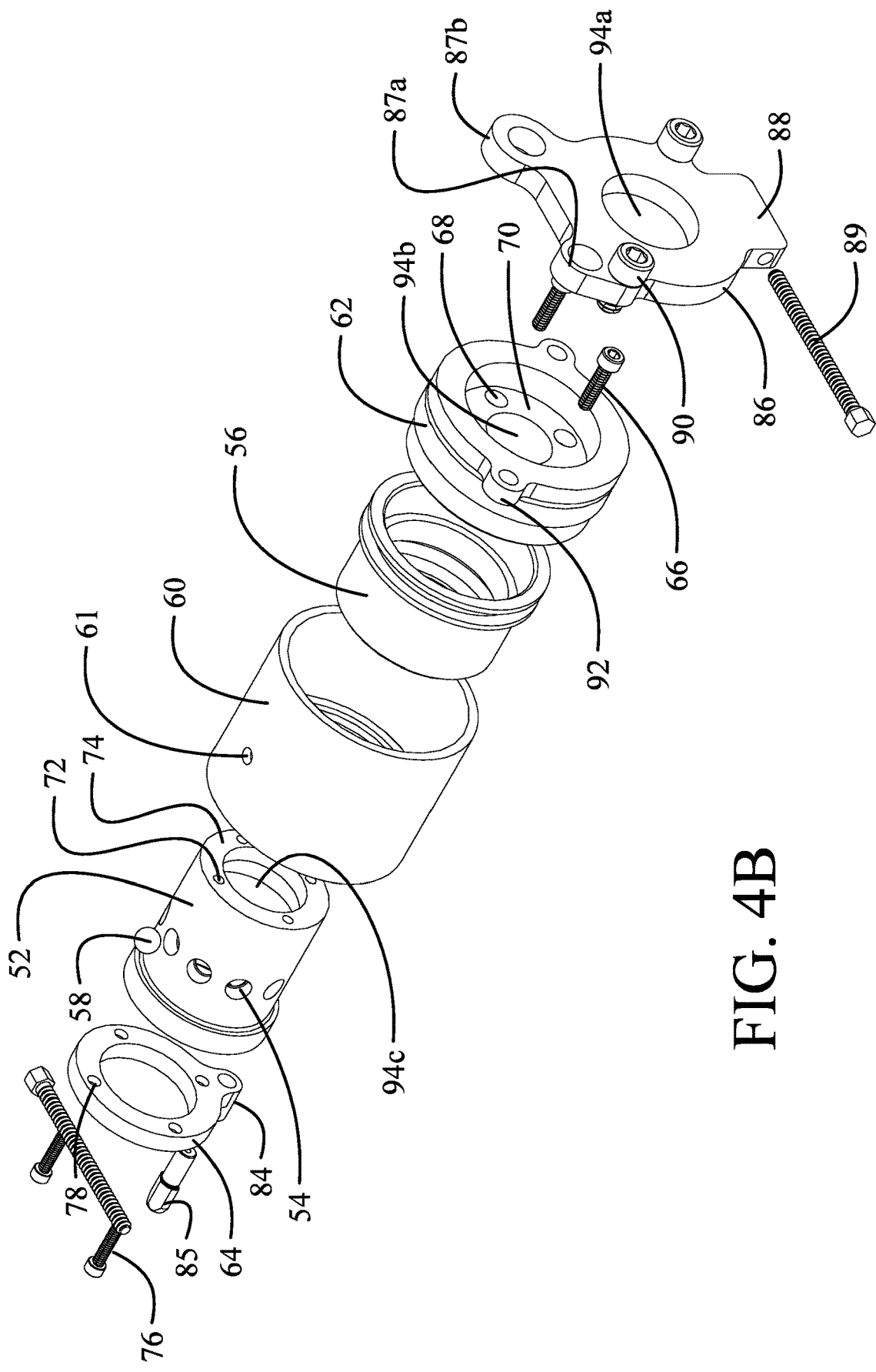
FIGS. 4B and 4C are forward and aft exploded views of the internal elements of the receiver assembly.
Figure 4C:
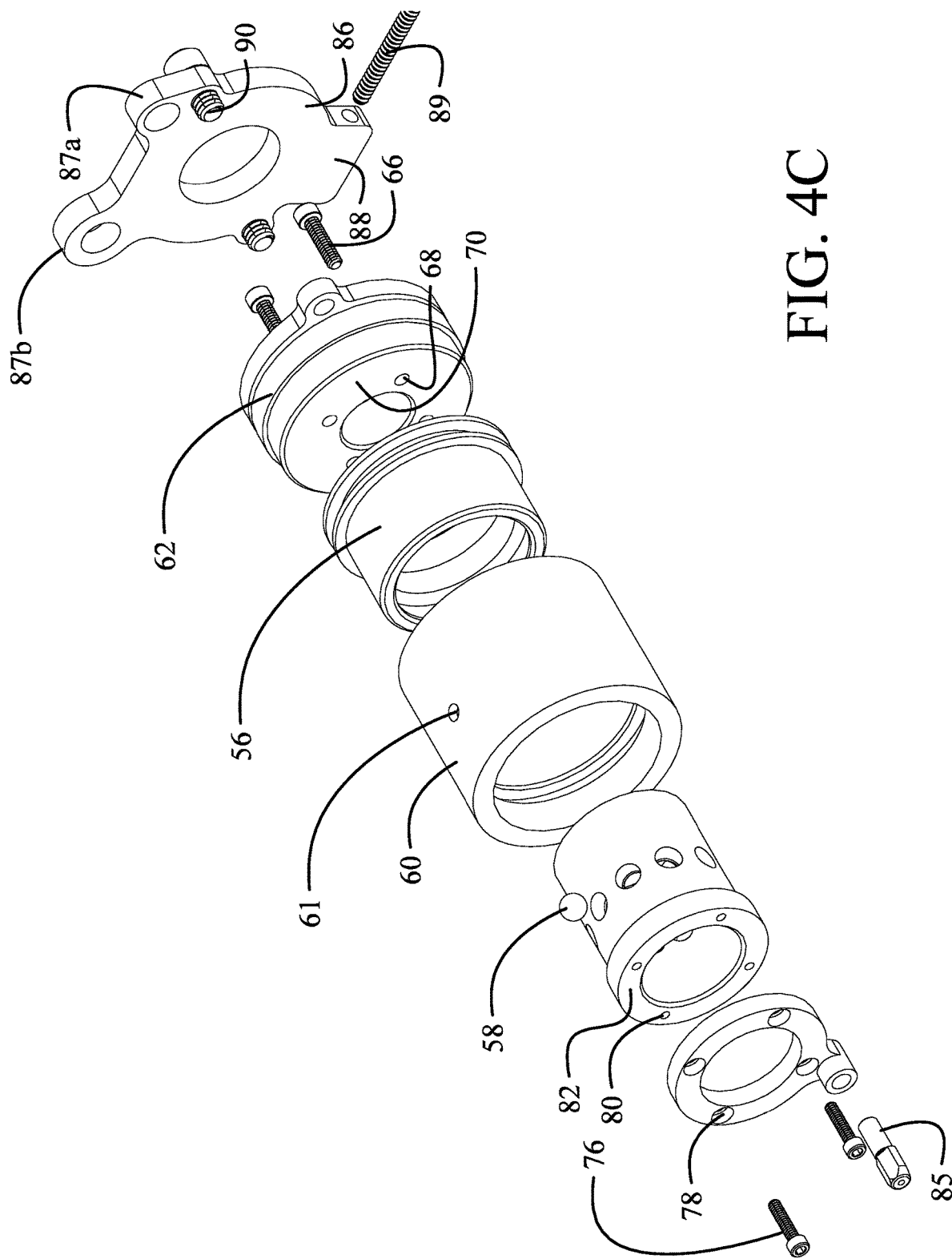

The receiver assembly 34 is seen in detail in FIGS. 4A, 4B and 4C, employs a cylindrical cavity 50 in a retainer barrel 52, having varying diameter portions described subsequently, configured to receive the probe 36. The retainer barrel 52 incorporates a plurality of circumferential locking bearing retention holes 54. A locking sleeve 56 is translated concentrically over the retainer barrel 52 between a locked position and a released position to constrain or release locking balls 58 (one example shown for clarity in FIGS. 4B and 4C). A pressure cylinder 60 concentrically receives the locking sleeve 56 providing sealing for vacuum or pneumatic actuation through a port 61 for translation of the locking sleeve. A cap 62 secures the locking sleeve and retainer barrel within the pressure cylinder in conjunction with a receiver flange 64.

For the example implementation, aft fasteners 66 received through bores 68 in a radial plate 70 in the cap are engaged in threaded holes 72 in an aft face 74 of the retainer barrel 52. Forward fasteners 76 received through bores 78 in the receiver flange 64 are engaged in threaded holes 80 in a forward face 82 of the retainer barrel 52. An aft alignment boss 84 extends from the receiver flange 64 for alignment with the forward alignment boss 46. An alignment pin 85 is configured to be received in the forward and aft alignment bosses 46, 84. The cap 62 is mounted to an attachment flange 86 secured to the frame 16 with a tab 88. A retention bolt 89 secures the attachment flange 86 to the frame 16. Securing bolts 90 engage threaded ears 92 on the cap 62. Concentric apertures 94a, 94b and 94c in the attachment flange 86, radial plate 70 of the cap 62 and retainer barrel 52 receive the two-piece core-bolt 33, which in the example implementation is composed of core-bolt shaft 30 and core-bolt receiver 31, as will be described subsequently. The attachment flange 86 incorporates support ears 87a and 87b for engagement fittings for the pneumatic actuator and debris extractor, to be described subsequently.

Figure 5A:
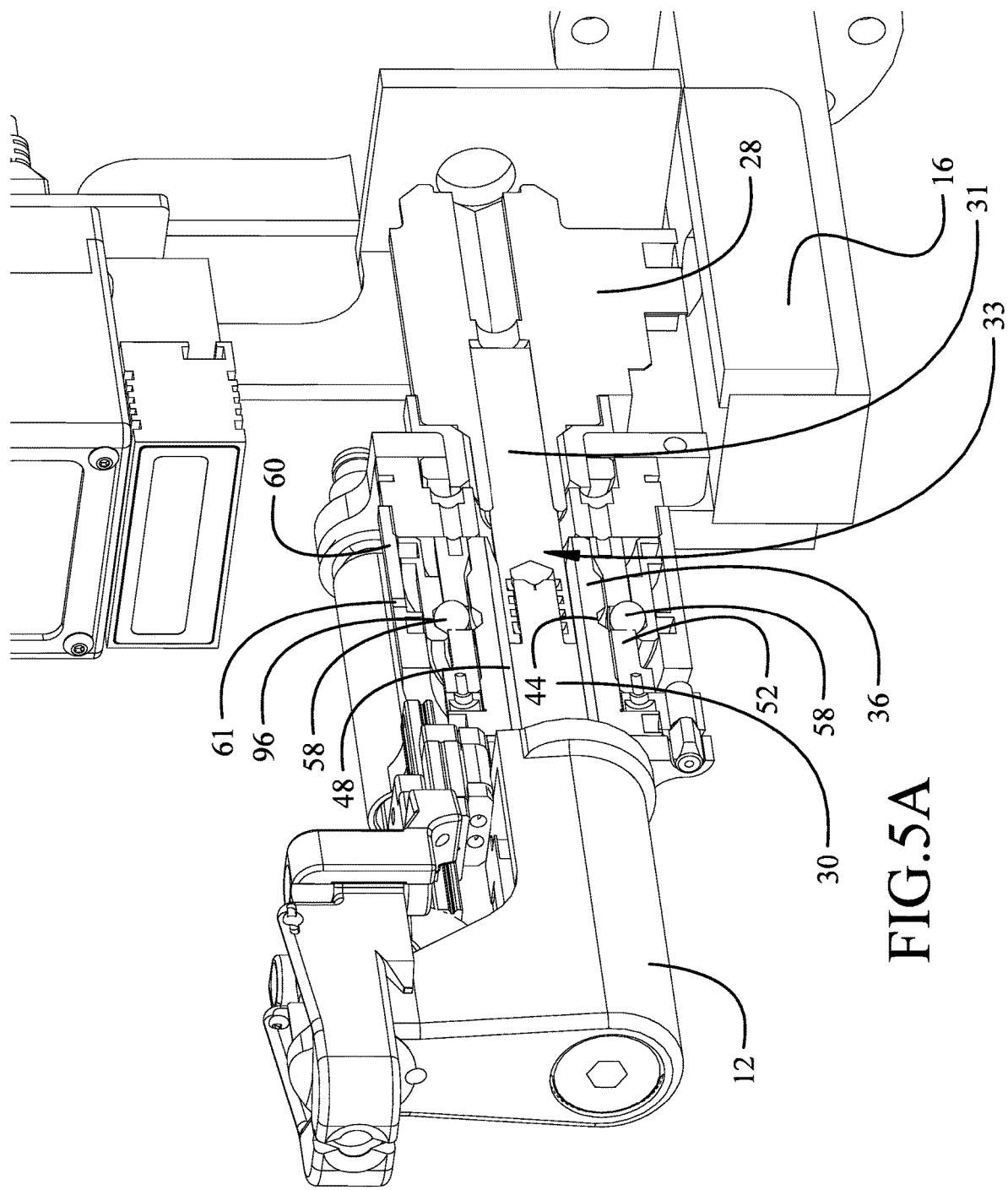
FIGS. 5A and 5B are detailed pictorial section and side section views of the connector assembly in the released position.
Figure 5B:
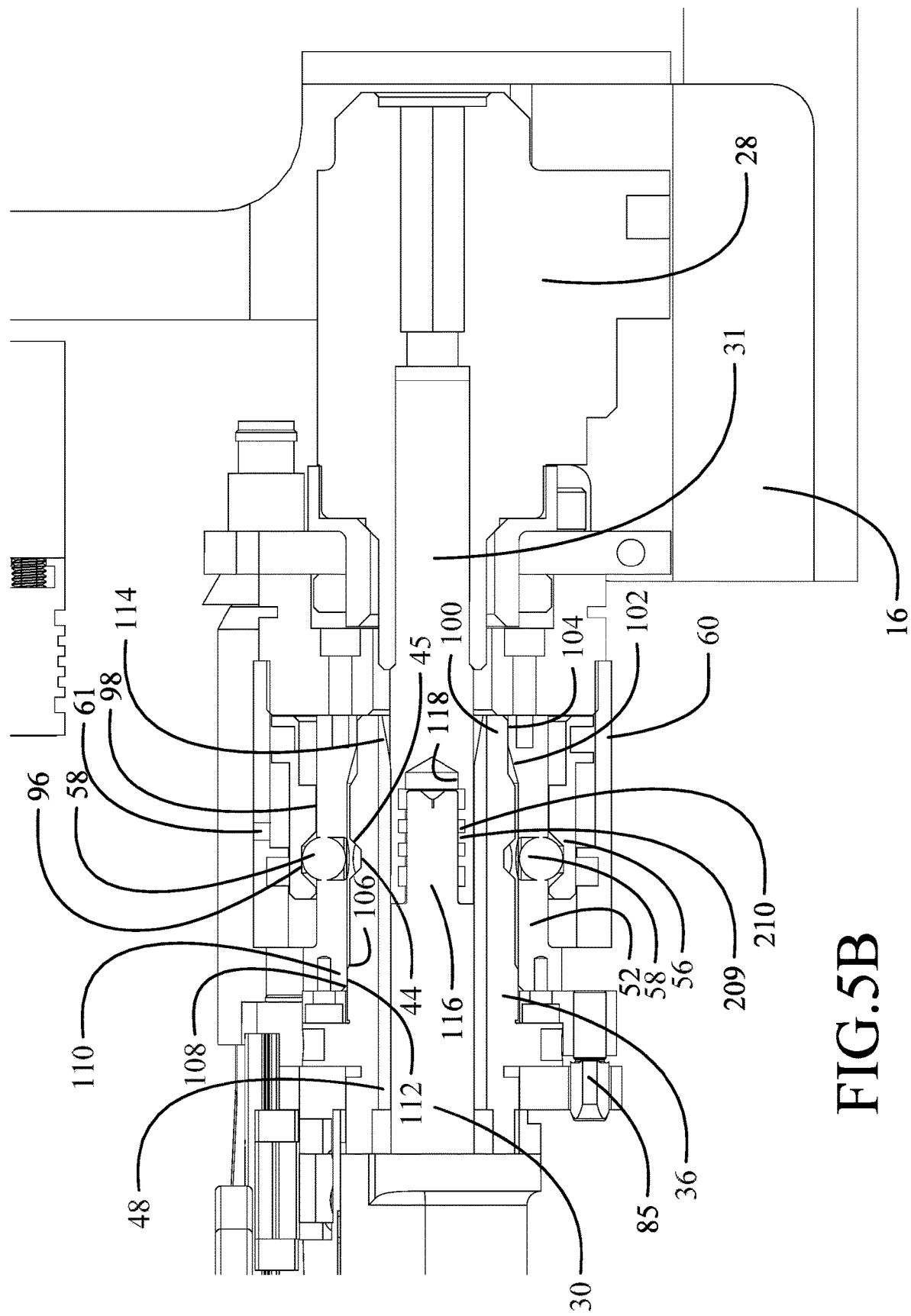

Engagement of the swage tool 12 and hydraulic operator 28 may be accomplished by the robotic manipulator 22 as an automated operation. As seen in FIGS. 5A and 5B, with the locking sleeve 56 translated to the released position, the manipulator may align the receiver assembly 34 with the probe assembly 32 and advance the receiver assembly to concentrically receive the probe 36 in the retainer barrel 52. With the locking sleeve in the released position, locking balls 58 are free to translate radially into a release relief 96 in the inner circumferential surface 98 of the locking sleeve 56.

Figure 5C:
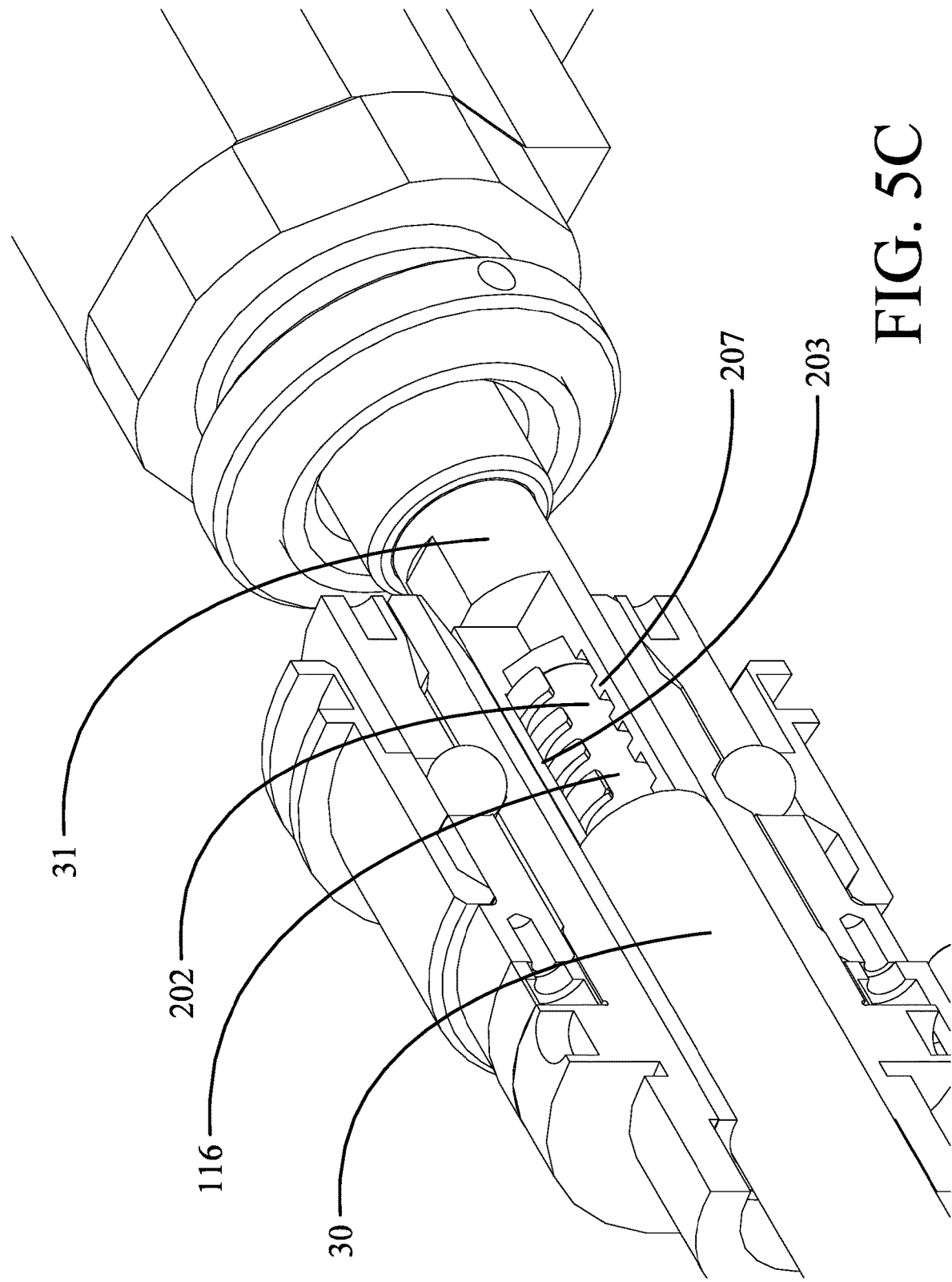
FIG. 5C is a detailed pictorial section view of the core-bolt in the released position.
Figure 5D:
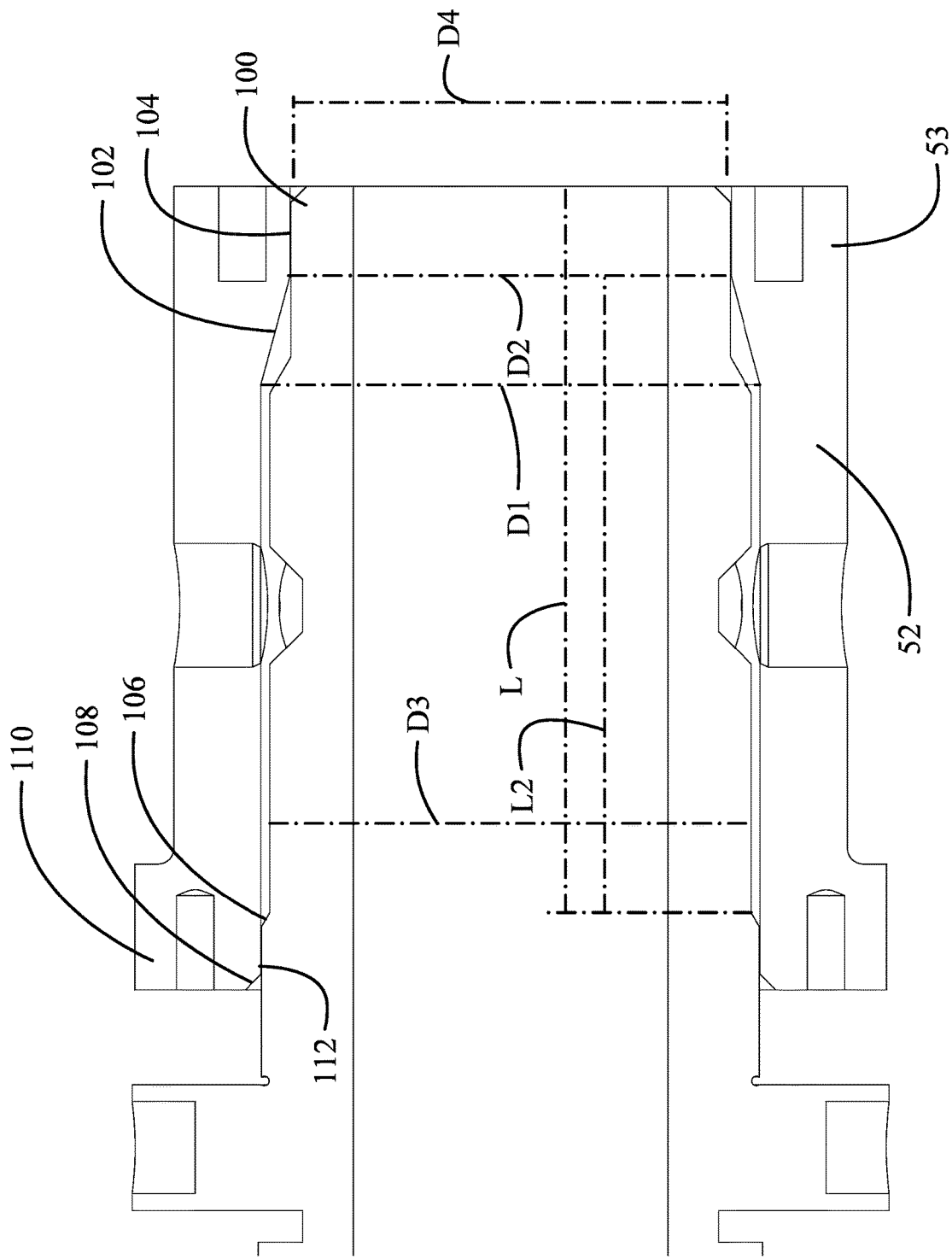
FIG. 5D is a detailed section view of the probe and retainer barrel in the receiver assembly.

As seen in detail in FIG. 5D, during insertion, a leading shoulder 100 on the probe 36 engages a taper 102 on an inner circumference of the retainer barrel 52, proximate an aft end 53 of the retainer barrel 52 to facilitate concentric alignment of the probe 36. Taper 102 starts at a diameter D1 and ends at a diameter D2, where diameter D1 is larger than diameter D2.

An outer diameter of the leading shoulder 100 is received in close tolerance by an aft cylindrical alignment flat 104 in the retainer barrel 52 at diameter D2. As insertion of the probe 36, continues, an inboard ramp 106 on the probe 36, engages a receiving taper 108 reducing to diameter D1 on a forward end 110 of the retainer barrel 52 for additional concentric alignment. A trailing cylindrical alignment flat 112 on the probe 36 is received in the inner diameter D1 of the receiving taper 108 in close tolerance. Probe 36 has a length L from a leading shoulder 100 to the inboard ramp 106. In the inserted position, there is a second length L2 from the inboard ramp 106 to the end of taper 102 at diameter D2.

The double tiered alignment flats, the cylindrical alignment flat 104 in the retainer barrel 52 and trailing cylindrical alignment flat 112 on the probe 36 provide bind free engagement of the precision male/female concentric interfaces. For close tolerance in the exemplary implementation, the retainer barrel 52 diameter D2 is 0.875" (+0.002"/−0.000") while the diameter of shoulder 104 is 0.871" (+0.002"/−0.000"). Similarly, retainer barrel 52 diameter D1 is 0.990" (+0.002"/−0.000") and the alignment flat 112 has a diameter of 0.987" (+0.002"/−0.000"). Binding of the leading shoulder 100 in the alignment flat 104 will not occur if $(D1-D3)*0.5/L<(D1-D4)/L3$ where L3 is L−L2, which equals the length of engagement of the leading shoulder 100 within the aft cylindrical alignment flat 104 of the retainer barrel 52 before engagement of the trailing cylindrical alignment flat 112 of the probe 36 in the receiving taper 108. Cylindrical land 42 contacts the receiver flange 64 when the probe 36 reaches full penetration of the retainer barrel 52.

As also seen in FIGS. 5A and 5B, the core-bolt bushing 48, concentrically carried in the probe 36 in the probe assembly 32, incorporates a leading ramp 114 to urge alignment of the core-bolt receiver 31 extending from the hydraulic operator 28 with the core-bolt shaft 30 in the bushing to join the core-bolt 33 during insertion of the probe 36 into the retainer barrel 52 as the core-bolt receiver 31 engages the core-bolt shaft 30. The bushing 48 provides high tolerance alignment of the outer diameters of the core-bolt shaft 30 and core-bolt receiver 31. In the exemplary implementation, the bushing 48 has an inner diameter of 0.485" (+0.002"/−0.000") which the core-bolt receiver 31 and core-bolt shaft 30 have an outer diameter of 0.483" (+0.000"/−0.003").

A head 116 on the core-bolt shaft is engaged in a cavity 118 in the core-bolt receiver. As previously described, the head 116 has alternating first linear bosses 201 and first linear pockets 202, and cavity 118 has mating second linear pockets 203 and second linear bosses 204. While alternating quadrants for the pockets and bosses are shown in the example implementation, hexagonal or octagonal patterns may be employed. In the open position as seen in FIG. 5C, the core-bolt shaft 30 and core-bolt receiver 31 are rotated relative to one another placing the linear bosses in one of the shaft or receiver adjacent the linear pockets on the other one of the shaft or receiver providing clearance allowing free insertion of the head 116 into the cavity 118.

Figure 6A:
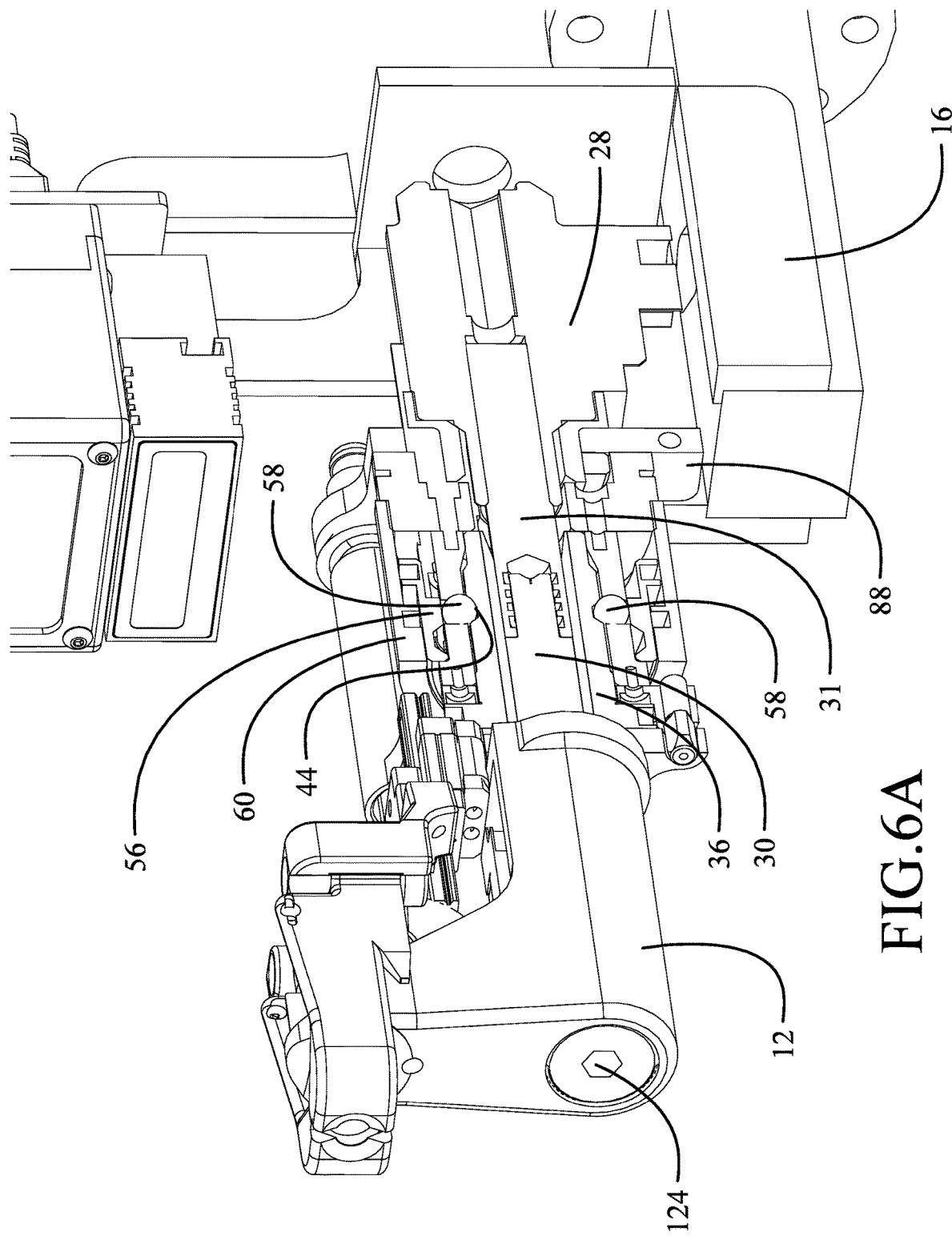
FIGS. 6A and 6B are detailed pictorial section and side section views of the connector assembly in the locked position.
Figure 6B:
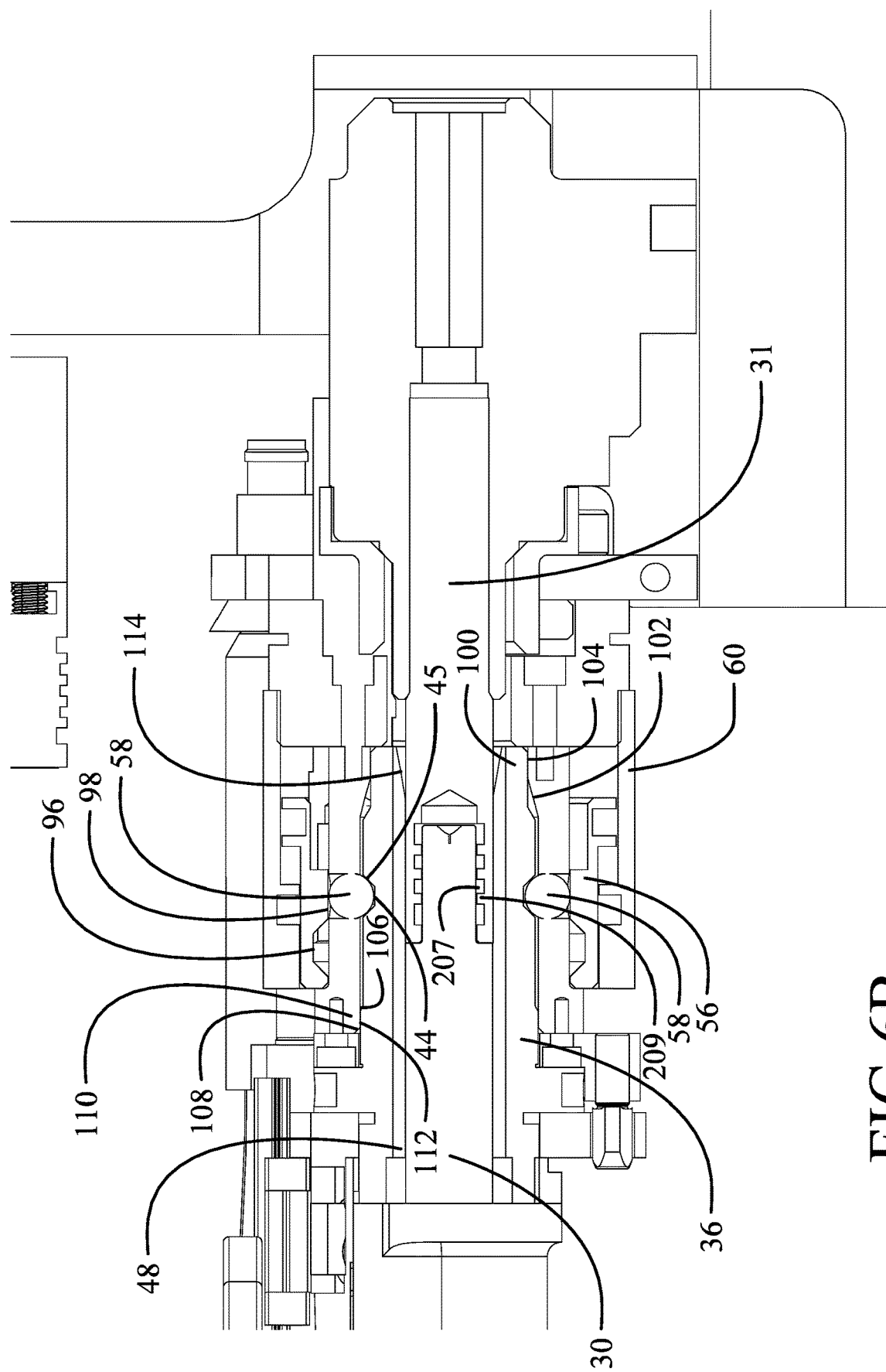
Figure 6C:
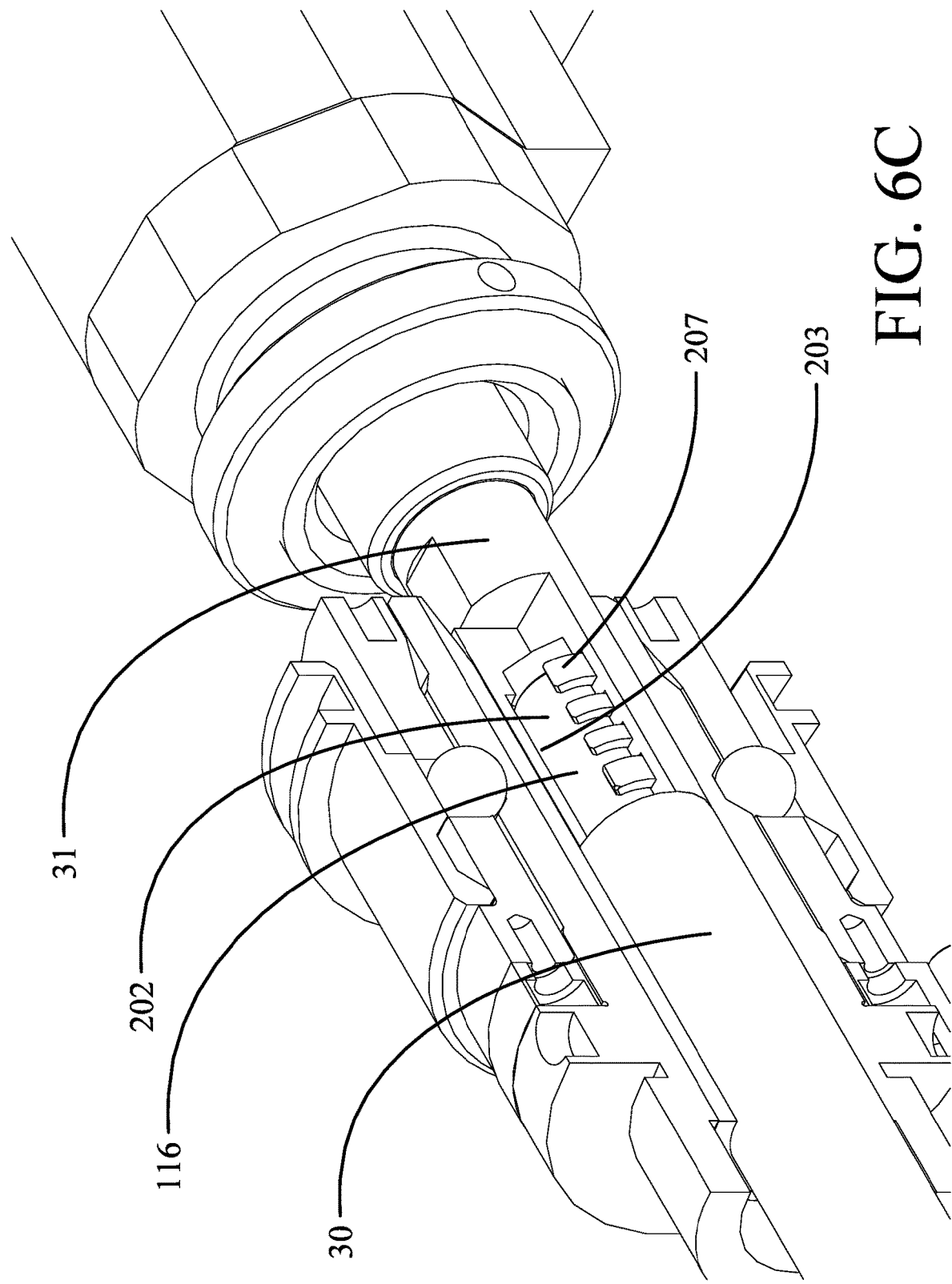
FIG. 6C is a detailed pictorial section view of the core-bolt in the locked position.

Locking of the connector assembly 14 is accomplished as shown in FIGS. 6A-6C. The locking sleeve 56 is translated to the locked position (moving aft to forward in the example implementation) by pneumatic/vacuum actuation through port 61, urging the locking balls 58 in contact with the inner circumferential surface 98 into the locking groove 44 on the probe 36 thereby securing the probe in the retainer barrel 52. The locking groove 44 incorporates sloping walls 45 to facilitate vertical motion of the locking balls 58 during insertion or removal of the probe 36 from the retainer barrel 52. Rotary actuation of either the core-bolt shaft 30 or core-bolt receiver 31 for 90° of rotation moves the rotational bosses 207, 209 from the linear pockets 202, 203 into the rotational pockets 208, 210 to interlock the cavity 118 and the head 116 as seen in FIG. 6C thereby providing actuation capability for the hydraulic operator 28 and the swage tool 12. In alternative implementations, the core-bolt receiver 31 may additionally be reciprocally translatable within the hydraulic operator 28 allowing the core-bolt receiver to be advanced to engage or retracted to disengage the core-bolt shaft 30 in a separate operation from the engagement of the probe assembly 32 and receiver assembly 34. In certain implementations the hydraulic operator may provide rotation of the core-bolt receiver 31. Rotation for engagement of the of the core-bolt shaft 30 and core-bolt receiver 31 may alternatively be accomplished by engagement of a tool stand mechanism with aft female hex key 125 on a piston accessible on an aft end of the hydraulic operator 28, which engages corebolt receiver 31 as seen in FIG. 2B or a comparable forward female hex key 124 on the core-bolt shaft 30 accessible on a forward end of the swage tool 12 as seen in FIG. 2A.

Figure 7A:
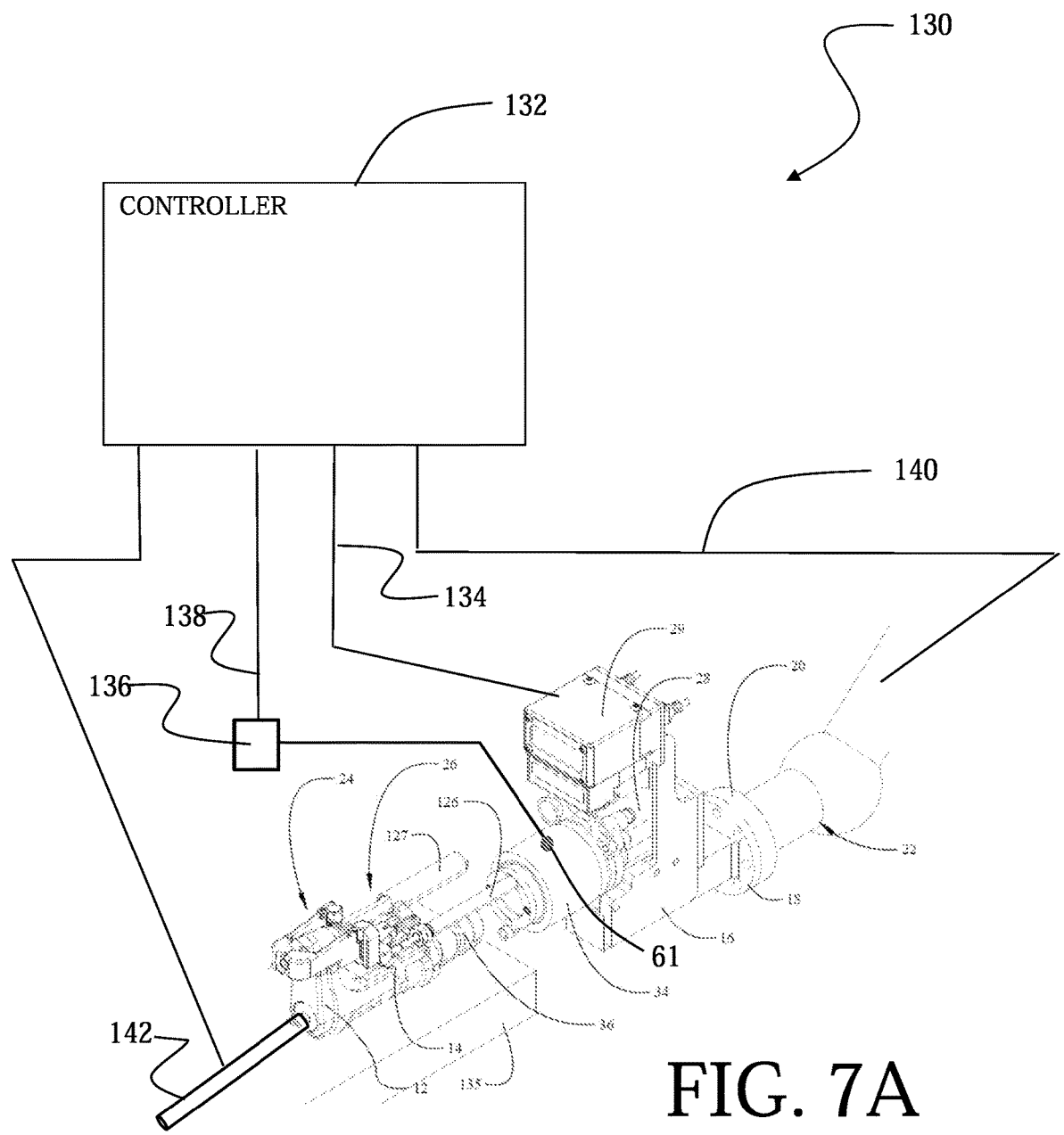
FIG. 7A is a block diagram of a control system for the elements of the implementation.
Figure 8:
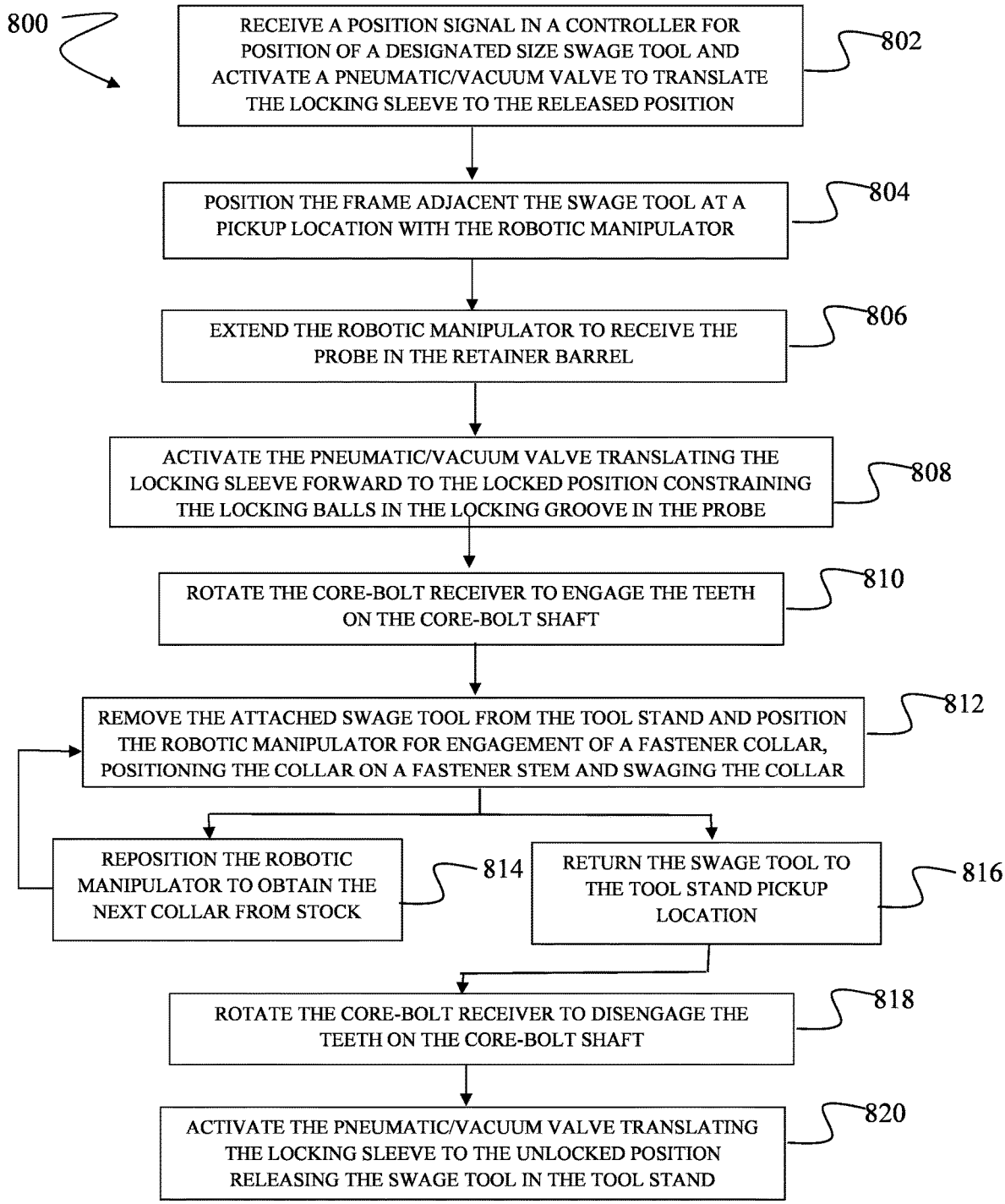
FIG. 8 is a flow chart of a method for automated exchange of a swage tool using the exemplary implementations; and, FIG. 9 is a pictorial representation of the disconnected swage tool on a tool stand and the frame with hydraulic operator carried by the robotic manipulator.

In operation, as described with respect to FIG. 7A for a block diagram of a control system 130 and FIG. 8 for a method 800 of automated exchange of a swage tool, a controller 132 is operably connected to the vision system and the robotic manipulator. The controller 132 receives a position signal 134 from the vision system 29 for a designated size swage tool 12 to be engaged from a tool stand 135 and activates a pneumatic/vacuum valve 136 connected to port 61 with control signal 138 to translate the locking sleeve 56 to the released position, step 802. Alternatively, with a translation spring associated with the locking sleeve to urge the sleeve aft, the locking sleeve may be in a normally released position.

The controller 132 is adapted to position the frame 16 adjacent the designated size swage tool 12 at a pickup location by controlling the robotic manipulator 22 through control bus 140, step 804. The controller 132 extends the robotic manipulator 22 receiving the probe 36 in the retainer barrel 52, step 806. The controller 132 then activates the pneumatic/vacuum valve 136 translating the locking sleeve 56 forward to the locked position constraining the locking balls 58 in the locking groove 44 in the probe 36, step 808. Alternatively, for a normally closed position, the translation spring may urge the locking sleeve 56 forward with deactivation of the pneumatic/vacuum valve 136.

Figure 7B:
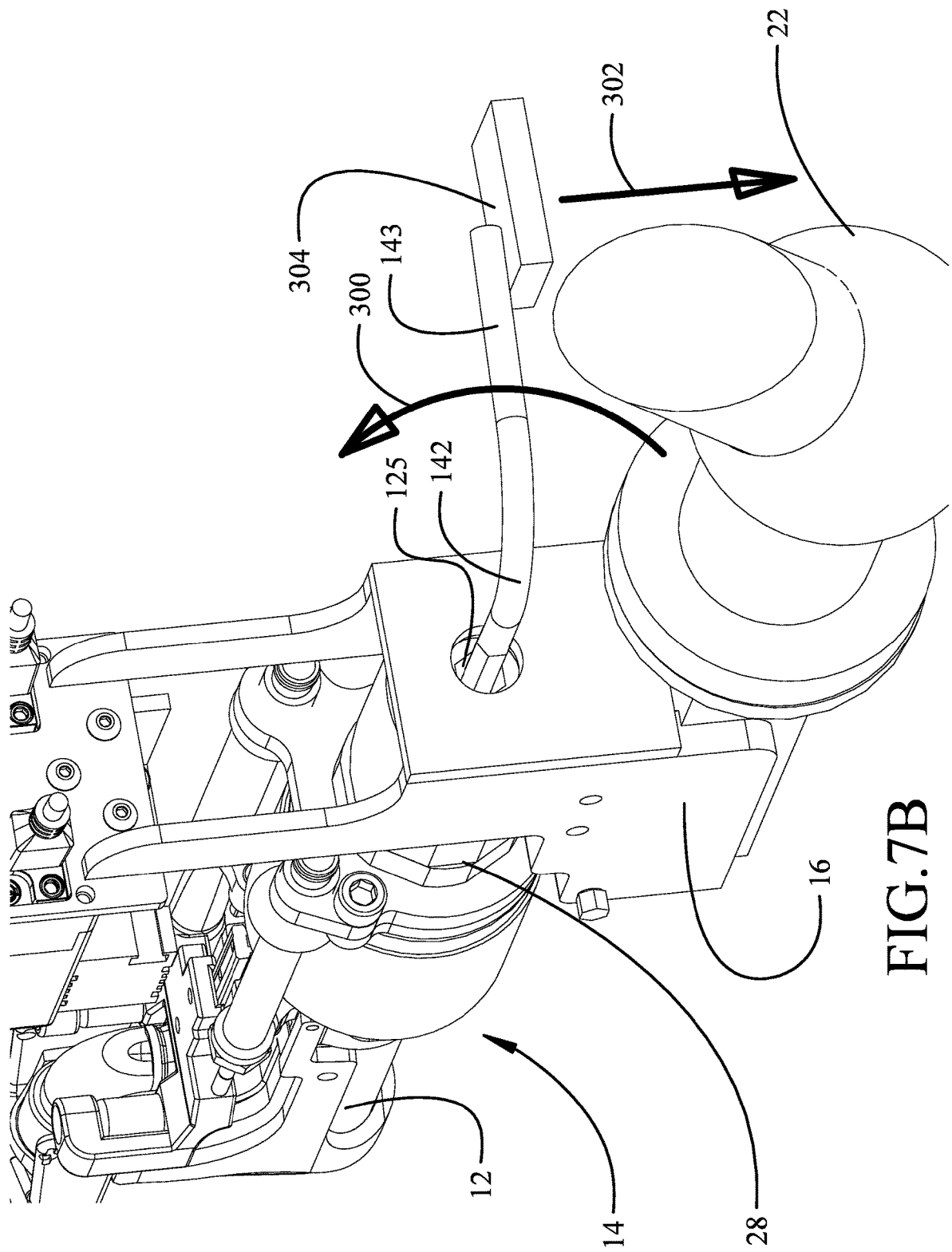
FIG. 7B is a rear detailed view of an example bolt receiver rotation tool.

The controller 132 then controls the hydraulic operator 28 to rotate the core-bolt receiver 31 to engage the teeth on the core-bolt shaft 30, step 810, Alternatively, in an example implementation as seen in FIG. 7B, an engagement tool 142 may be present in the hex key 125 and the robotic manipulator 22, with the swage tool 12 engaged in the connector assembly 14, may create rotational motion (represented by arrow 300) in the engagement tool through 90 degrees when the robotic manipulator executes a linear motion (represented by arrow 302) normal to the lever 143 of the engagement tool 142 against a fixed flange 304 or as previously described, the engagement tool 142 may be present on the tool stand and employed to rotate either of the hex keys 124, 125 on the core-bolt shaft 30 or core-bolt receiver 31. The engagement tool 142 may be fixed on the stand and the controller 132 may activate the robotic manipulator 22 to rotate the end effector 10 with respect to the engagement tool 142.

The controller 132 then removes the attached swage tool 12 from the tool stand and positions the robotic manipulator 22 for engagement of a fastener collar, positioning of the collar on a fastener stem and swaging the collar, step 812. The robotic manipulator 22 is then repositioned by the controller 132 for obtaining the next collar from stock, step 814, or returns the swage tool 12 to the tool stand pickup location, step 816.

Figure 9:
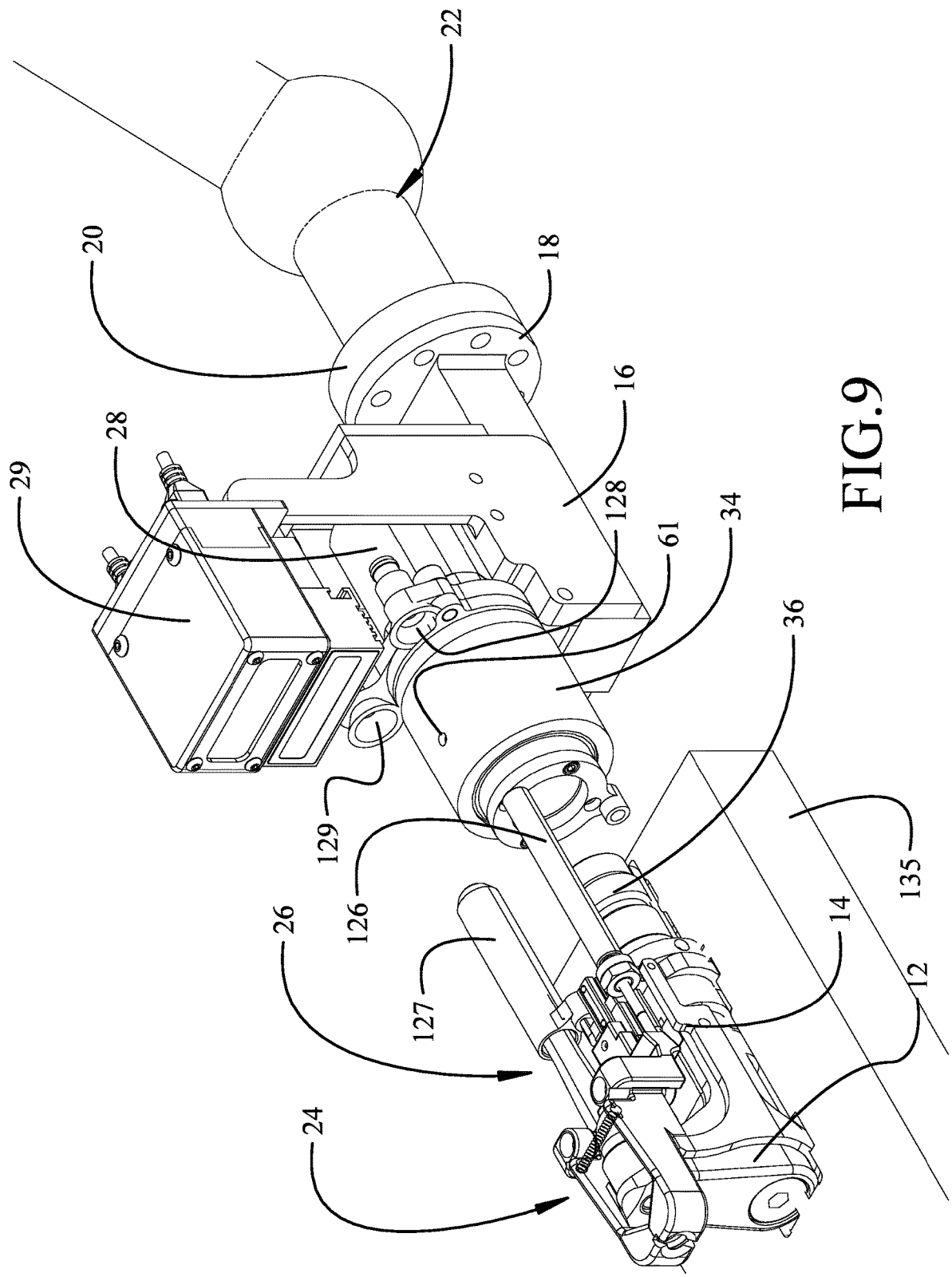

To remove the swage tool 12, the hydraulic operator 28 actuates (or the tool stand engages the hex key) to rotate the core-bolt receiver 31 to disengage the teeth on the core-bolt shaft 30, step 818, and the pneumatic/vacuum valve 136 is actuated with control signal 138 to translate the locking sleeve 56 to the released position to release the swage tool 12 in the tool stand, step 820. As seen in FIG. 9, the swage tool 12, as docked on the tool stand 135 may retain a pneumatic actuator 126 for the collar engagement jaw assembly 24 and a debris extractor 127 while quick connect engagement fittings 128, 129 remain on the attachment flange 86 with the frame 16 and hydraulic operator 28 allowing completely automated tool change.

Having now described various implementations in detail as required by the patent statutes, those skilled in the art will recognize modifications and substitutions to the specific implementations disclosed herein. Such modifications are within the scope and intent of the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. As used herein the terms "upper" and "lower", "left" and "right", "forward" and "aft" are employed to describe relative positioning and other than for the specific implementations disclosed may be substituted with appropriate descriptors such as "first" and "second", "top" and "bottom" or "right" and "left" depending on orientation of actual implementation.

What is claimed is:

1. A lockbolt swage end effector for use with a robotic manipulator, the end effector comprising:
    a lockbolt swage tool;
    a frame;
    a hydraulic operator carried in the frame;
    a connector assembly releasably engaging the hydraulic operator and lockbolt swage tool, the connector assembly comprising a probe assembly extending from the lockbolt swage tool that is removably engageable in a receiver assembly attached to the hydraulic operator wherein the probe assembly comprises:
        a probe concentrically insertable into the receiver assembly, the probe having a land and a locking groove;
        a probe flange having a top plate fastened to the lockbolt swage tool, the land on the probe abutting the probe flange;
        a forward alignment boss extending from the probe flange; and
        a core-bolt bushing concentrically housed within the probe;
    a two-piece core-bolt operably connecting the lockbolt swage tool and the hydraulic operator through the connector assembly wherein the two-piece core-bolt has a core-bolt shaft and a core-holt receiver, the core-bolt shaft extending from the lockbolt swage tool and the core-bolt receiver extending from the hydraulic operator; and
    a connection flange on the frame attaching the frame to the robotic manipulator.

2. The lockbolt swage end effector as defined in claim 1 wherein the receiver assembly comprises:
    a retainer barrel having a cylindrical cavity configured to receive the probe, the retainer barrel having a plurality of locking bearing retention holes;
    a plurality of locking balls received in the plurality bearing retention holes;
    a locking sleeve translatable over the retainer barrel between a locked position and a released position to constrain or release the plurality of locking balls in the plurality of bearing retention holes;
    a pressure cylinder receiving the locking sleeve and having a port, the pressure cylinder providing sealing for vacuum or pneumatic actuation through the port for translation of the locking sleeve;
    a cap securing the locking sleeve and retainer barrel within the pressure cylinder, and
    a receiver flange engaged to a forward face of the retainer barrel.

3. The lockbolt swage end effector as defined in claim 2 further comprising:
    aft fasteners received through first bores in a radial plate in the cap and engaged in first threaded holes in an aft face of the retainer barrel;
    forward fasteners received through second bores in the receiver flange and engaged in second threaded holes in a forward face of the retainer barrel; and
    an attachment flange secured to the frame with a tab, the cap mounted to the attachment flange with securing bolts engaging threaded ears on the cap.

4. The lockbolt swage end effector as defined in claim 3 further comprising:
    an aft alignment boss extending from the receiver flange for alignment with the forward alignment boss; and
    an alignment pin configured to be received in the forward and aft alignment bosses.

5. The lockbolt swage end effector as defined in claim 2 wherein with the locking sleeve in the released position, the plurality of locking balls are free to translate radially into a release relief in an inner circumferential surface of the locking sleeve.

6. The lockbolt swage end effector as defined in claim 5 wherein:
    a leading shoulder on the probe engages a taper on an inner circumference of the retainer barrel, for concentric alignment of the probe;
    an outer diameter of the leading shoulder is received in close tolerance by an aft cylindrical alignment flat in the retainer barrel;
    an inboard ramp on the probe engages a receiving taper on a forward end of the retainer barrel for additional concentric alignment; and
    a trailing cylindrical alignment flat on the probe is received in an inner diameter of the receiving taper in close tolerance.

7. The lockbolt swage end effector as defined in claim 6 wherein cylindrical land contacts the receiver flange with the probe at full penetration of the retainer barrel.

8. The lockbolt swage end effector as defined in claim 6 wherein the locking sleeve translated to the locked position contacts the plurality of locking balls on an inner circumferential surface urging the locking balls into the locking groove on the probe thereby securing the probe in the retainer barrel wherein the locking groove incorporates sloping walls to facilitate vertical motion of the plurality of locking balls during insertion or removal of the probe from the retainer barrel.

9. The lockbolt swage end effector as defined in claim 6 wherein:
the taper proximate the aft end of the retainer barrel starts at a first diameter D1 and ends at a second diameter D2;
the aft cylindrical alignment flat in the retainer barrel has a diameter equal to second diameter D2;
the receiving taper on the forward end of the retainer barrel engaging the inboard ramp on the probe, said receiving taper reducing to the first diameter D1;
the trailing cylindrical alignment flat on the probe is configured to be received in the first diameter D1 of the receiving taper;
said probe having a length L from the leading shoulder to the inboard ramp and a second length L2 from the inboard ramp to the end of the taper at the second diameter D2 to provide bind free engagement of the probe and the retainer barrel during insertion of the probe.

10. The lockbolt swage end effector as defined in claim 9 wherein $(D1-D3)*0.5/L < (D1-D4)/L3$ where L3 is L−L2.

11. The lockbolt swage end effector as defined in claim 2 wherein the core-bolt bushing incorporates a leading ramp to urge alignment of the core-bolt receiver with the core-bolt shaft in the bushing during insertion of the probe into the retainer barrel.

12. The lockbolt swage end effector as defined in claim 11 wherein the core-bolt shaft and the core-bolt receiver each have a plurality of linear bosses and linear pockets, said linear bosses of the core-bolt shaft longitudinally received within the linear pockets of the core-bolt receiver in an aligned orientation.

13. The lockbolt swage end effector as defined in claim 12 wherein the core-bolt shaft and core-bolt receiver further have a plurality of rotational bosses and rotational pockets, said rotational bosses of the core-bolt shaft received in the rotational pockets of the core-bolt receiver in a rotated position to secure the core-bolt shaft and the core-bolt receiver.

14. The lockbolt swage end effector as defined in claim 13 wherein the core-bolt shaft has a key on the core-bolt receiver accessible on an aft end of the hydraulic operator or a comparable key accessible on a forward end of the swage tool whereby rotation for engagement of the of the core-bolt shaft 30 and core-bolt receiver is accomplished by engagement of a tool stand mechanism.

15. A method for automated exchange of a lockbolt swage tool on a lockbolt swage end effector as defined in claim 1, the method comprising:
receiving a position signal in a controller for a designated size lockbolt swage tool to be engaged from a tool stand and activating a pneumatic/vacuum valve connected to port with a control signal to translate a locking sleeve to a released position;
positioning the frame carrying the hydraulic operator adjacent the designated size lockbolt swage tool by controlling a robotic manipulator connected to the frame;
extending the robotic manipulator to receive a probe extending from the lockbolt swage tool in a retainer barrel of the connector assembly releasably engaging the hydraulic operator and the lockbolt swage tool;
activating the pneumatic/vacuum valve translating a locking sleeve over the retainer barrel to a locked position constraining a plurality of locking balls in a locking groove in the probe;
rotating a core-bolt receiver extending from the hydraulic operator or a core-bolt shaft extending from the swage tool to engage rotational bosses and rotational pockets between the core-bolt receiver and core-bolt shaft; and
removing the swage tool from the tool stand and positioning the robotic manipulator for engagement of a fastener collar, positioning the collar on a fastener stem and swaging the collar.

16. The method as defined in claim 15 wherein the step of rotating a core-bolt receiver or a core-bolt shaft comprises controlling the hydraulic operator to rotate the core-bolt receiver, or rotating either of a forward key on the core-bolt shaft or an aft key on the core-bolt receiver with an engagement tool on the tool stand.

17. The method of claim 15 further comprising:
repositioning the robotic manipulator for obtaining the next collar from stock.

18. The method of claim 15 further comprising returning the swage tool to the tool stand pickup location.

* * * * *

UNITED STATES PATENT AND TRADEMARK OFFICE
CERTIFICATE OF CORRECTION

| | |
|---|---|
| PATENT NO. | : 11,938,616 B2 |
| APPLICATION NO. | : 17/366624 |
| DATED | : March 26, 2024 |
| INVENTOR(S) | : Dennis R. Mathis et al. |

It is certified that error appears in the above-identified patent and that said Letters Patent is hereby corrected as shown below:

In the Claims

In Claim 1, Line 4, "core-holt" is corrected to read "core-bolt".

Signed and Sealed this
Seventh Day of May, 2024

*Katherine Kelly Vidal*

Katherine Kelly Vidal
*Director of the United States Patent and Trademark Office*